United States Patent
Brucker et al.

(10) Patent No.: US 10,318,739 B2
(45) Date of Patent: Jun. 11, 2019

(54) COMPUTING OPTIMAL FIX LOCATIONS FOR SECURITY VULNERABILITIES IN COMPUTER-READABLE CODE

(71) Applicant: SAP SE, Walldorf (DE)

(72) Inventors: Achim D. Brucker, Sheffield (GB); Helmut Petritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 241 days.

(21) Appl. No.: 15/000,745

(22) Filed: Jan. 19, 2016

(65) Prior Publication Data

US 2017/0206360 A1     Jul. 20, 2017

(51) Int. Cl.
| G06F 11/00 | (2006.01) |
| G06F 12/14 | (2006.01) |
| G08B 23/00 | (2006.01) |
| G06F 21/57 | (2013.01) |

(52) U.S. Cl.
CPC ................................. G06F 21/577 (2013.01)

(58) Field of Classification Search
CPC .................................................... G06F 21/577
See application file for complete search history.

(56) References Cited

U.S. PATENT DOCUMENTS

| 8,136,065 B2 | 3/2012 | Huang et al. |
| 8,387,017 B2 | 2/2013 | Calendino et al. |
| 8,473,505 B2 | 6/2013 | Brucker et al. |
| 8,539,466 B2 | 9/2013 | Abadi et al. |
| 8,793,665 B2 | 7/2014 | Murthy |
| 8,881,293 B1 | 11/2014 | Brucker et al. |
| 8,959,646 B2 * | 2/2015 | Brucker ................ G06F 21/577 726/25 |
| 9,077,745 B1 * | 7/2015 | Kline .................. H04L 63/1433 |
| 9,195,841 B2 | 11/2015 | Cras et al. |
| 9,235,716 B1 | 1/2016 | Brucker et al. |
| 9,256,757 B2 | 2/2016 | Brucker et al. |
| 9,286,187 B2 | 3/2016 | Brucker et al. |

(Continued)

OTHER PUBLICATIONS

Tripp, Omer et al.; "TAJ: Effictive Taint Analysis of Web Applications"; PLDI '09 Proceedings of the 30th ACM SIGPLAN Conference on Programming Language and Design and Implementation; ACM SIGPLAN Notices—PLDI '09; vol. 44, Ussue 6, Jun. 2009, pp. 87-97 ACM Digital Library DOI; 10.1145/1543135.1542486; located via Google Scholar at http://dl.acm.org/citation.cfm?id=1542486.

(Continued)

*Primary Examiner* — Phy Anh T Vu
(74) *Attorney, Agent, or Firm* — Fish & Richardson P.C.

(57) ABSTRACT

Implementations of the present disclosure include methods, systems, and computer-readable storage mediums for determining optimal fix locations for security vulnerabilities in computer-readable code. Implementations include actions of identifying data flows from respective sources to respective sinks in computer-executable code based on information associated with the computer-executable code, determining vulnerability information of the sources, the sinks, and the data flows based on information of vulnerable sources and sinks stored in a database, and providing a graph representation of the code for display, the graph representation depicting the data flows from the respective sources to the respective sinks with the vulnerability information.

20 Claims, 14 Drawing Sheets

(56) References Cited

U.S. PATENT DOCUMENTS

| | | | |
|---|---|---|---|
| 9,305,168 B2 | 4/2016 | Brucker et al. | |
| 2002/0171644 A1* | 11/2002 | Reshetov | G06T 17/20 345/420 |
| 2005/0161065 A1* | 7/2005 | Blansit | B08B 3/02 134/115 R |
| 2006/0080656 A1* | 4/2006 | Cain | G06F 8/65 717/174 |
| 2007/0106979 A1* | 5/2007 | Felts | G06F 8/60 717/124 |
| 2007/0186284 A1* | 8/2007 | McConnell | G06F 21/55 726/25 |
| 2008/0271019 A1* | 10/2008 | Stratton | G06F 21/577 718/1 |
| 2011/0302566 A1 | 12/2011 | Abadi et al. | |
| 2011/0321165 A1* | 12/2011 | Capalik | G06F 11/3471 726/25 |
| 2012/0304161 A1* | 11/2012 | Ahadi | G06F 8/433 717/156 |
| 2013/0133075 A1* | 5/2013 | Abadi | G06F 21/577 726/25 |
| 2013/0227695 A1* | 8/2013 | Shankar | G06F 21/577 726/25 |
| 2014/0041561 A1 | 2/2014 | Morris et al. | |
| 2014/0173741 A1* | 6/2014 | Gluck | G06F 21/54 726/25 |
| 2014/0359776 A1 | 12/2014 | Liu | |
| 2014/0380486 A1* | 12/2014 | Brucker | G06F 21/577 726/25 |
| 2015/0096036 A1 | 4/2015 | Beskrovny et al. | |
| 2015/0271199 A1* | 9/2015 | Bradley | H04L 63/1441 726/25 |
| 2017/0004065 A1* | 1/2017 | Angwin | G06F 11/3668 |

OTHER PUBLICATIONS

Livshits, Benjamin et al. "Towards Fully Automatic Placement of Security Sanitizers and Declassifiers" POPL '13 Proceedings of the 40th Annual ACM SIGPLAN-SIGACT Symposium on Principles of Programming Languages; Jan. 23-25, 2013, Rome Italy; located via Google at http://dlacm.ord/citation.cfm?id=2429115.

Yamaguchi, F., et al. "Modeling and Discovering Vulnerabilities with Code Property Graphs", 2014 IEEE Symposium on Security and Privacy (SP): Institute of Electrical and Electronics Engineers Inc.; May 18-21, 2014; located via Google at http://userinformatik.uni-goettingen.de/~krieck/docs/2014-ieeesp.pdf.

* cited by examiner

COMPUTING OPTIMAL FIX LOCATIONS FOR SECURITY VULNERABILITIES IN COMPUTER-READABLE CODE

BACKGROUND

Finding and fixing security (or safety) problems of a computer program (or software) are critical, as the problems can endanger the security of the computer program. For example, the problems can include injection attacks within (web) applications such as SQL injection and cross-site scripting (XSS), or private data leaks in mobile applications. When fixing the problems, there can be two conflicting goals: fixing the problems with the smallest possible changes to the existing code, and ensuring that no existing functionality is modified or harmed unintentionally. Additionally, not all findings reported by an automated test tool (e.g., an application security testing tool) are real issues. Thus, a human expert may need to analyze such findings to decide, if the findings need to be fixed or not. Besides large effort, these two conflicting goals also require a highly skilled expert, and thus further increases the costs.

SUMMARY

Implementations of the present disclosure include computer-implemented methods for computing optimal fix locations for security vulnerabilities in computer-readable code. In some implementations, methods include actions of identifying data flows from respective sources to respective sinks in computer-executable code based on information associated with the computer-executable code, determining vulnerability information of the sources, the sinks, and the data flows based on information of vulnerable sources and sinks stored in a database, and providing a graph representation of the code for display, the graph representation depicting the data flows from the respective sources to the respective sinks with the vulnerability information.

These and other implementations can each optionally include one or more of the following features: the actions further comprise identifying, in the generated graph representation, a first vulnerable data flow from at least one first source to a first sink and a second vulnerable data flow from at least one second source to a second sink, the at least one first source and the at least one second source comprising a common source; determining at least one sanitizer for the first and second vulnerable data flows based on information of sanitizers stored in the database that associates respective sanitizers with respective sources and sinks; inserting the at least one sanitizer at each of a plurality of locations in at least one of the first data flow or the second data flow; determining that the at least one sanitizer fixes vulnerability of the first and second data flows at one or more fix locations of the plurality of locations; selecting an optimal fix location from the fix locations for the at least one sanitizer; and generating a new graph representation of the code comprising the non-vulnerable first and second data flows with the at least one sanitizer at the optimal fix location. The at least one sanitizer comprises first and second sanitizers, each of the plurality of locations comprises a respective set of a first location for the first sanitizer and a second location for the second sanitizer, and determining that the at least one sanitizer fixes vulnerability of the first and second data flows comprises determining, for each of the fix locations, that the first sanitizer at a first fix location and the second sanitizer at a second fix location fix the vulnerability of the first and second data flows. The information of sanitizers comprises conflicts between the sanitizers, and determining that the at least one sanitizer fixes vulnerability of the first and second data flows comprises determining that the at least one sanitizer at each of the fix locations causes no conflicting sanitization with one or more existing sanitizers in the first and second data flows. Selecting an optimal fix location comprises determining that inserting the at least one sanitizer at the optimal fix location causes at least one of a minimum modification of the code or a minimum effect on functionality of the code. Inserting the at least one sanitizer at each of a plurality of locations in at least one of the first data flow or the second data flow comprises starting the inserting from one of a location adjacent to the first sink in the first data flow and the second sink in the second dataflow and a location adjacent to the common source. The actions further comprise computing visualization of the graph representation of the code in a user interface (UI); receiving an input to change one or more data flows in the visualized graph representation through the UI, the changing comprising at least one of adding a sanitizer or a source or a sink, removing a sanitizer or a source or a sink, or adjusting a location order of at least two sanitizers; determining vulnerability information of the changed data flows based on the information of vulnerable sources and sinks and information of sanitizers stored in the database, the database associating respective sanitizers with respective sources and sinks; generating a new graph representation of the code comprising the changed data flows with the corresponding determined vulnerability information; and computing visualization of the new graph representation of the code in the UI.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
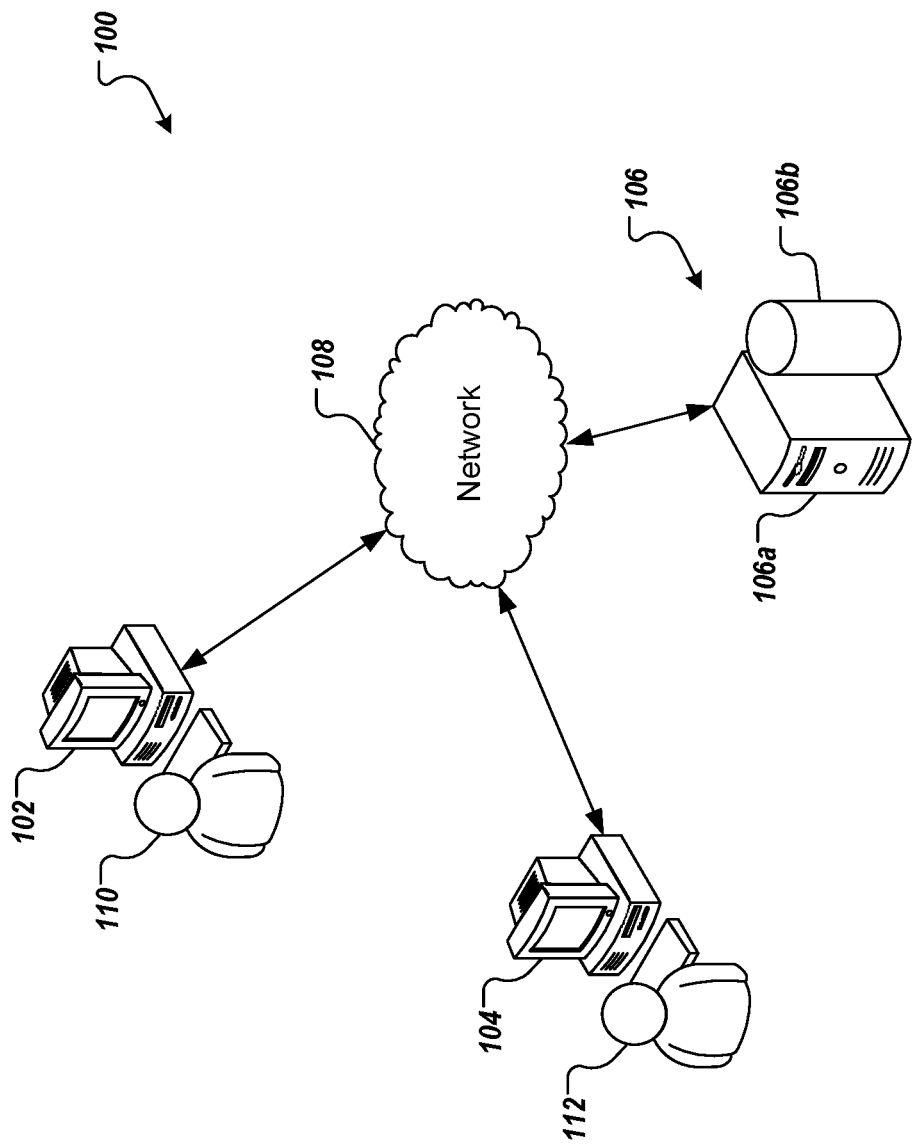
FIG. 1 depicts an example architecture in accordance with implementations of the present disclosure.

Implementations of the present disclosure are generally directed to computing visualization of a graph representation of computer-readable code. The graph representation includes security vulnerabilities of the code, such as vulnerable data flows, sources, and/or sinks. The vulnerable data flows, sources, and/or sinks in the code can be identified based on information associated with the code (e.g., findings of an automated test tool) and information of vulnerable sources and sinks (and sanitizers) stored in a database. The database can include different types of vulnerable sources and sinks and sanitizers, as well as conflicts between sanitizers and associations between sanitizers with respective sources and sinks.

Implementations of the present disclosure are also generally directed to computing (e.g., automatically) optimal fix locations for secure vulnerabilities of the code, particularly using the computed graph representation of the code. Vulnerable data flows can be represented in the computed graph representation. One or more sanitizers can be determined for the vulnerable data flows and inserted at a set of locations in the vulnerable data flows to check whether the sanitizers at the set of locations can fix the vulnerabilities of the data flows. The check also includes determining whether the inserted sanitizers cause conflicting sanitizations among the inserted sanitizers themselves and with existing sanitizers in the data flows. If there is no conflict, the set of locations is determined as a set of fix locations for the sanitizers. If a conflict is detected, a next possible set of locations for the sanitizers is tested. In some cases, one or more additional sanitizers are introduced to eliminate the conflict.

The sanitizers can be inserted starting backward from a location adjacent to a sink (e.g., as close as possible to the sink) or forward from a location adjacent to a source (e.g., as close as possible to the source). The insertion of the sanitizers in the data flows is continued until a limited search depth is reached or all possible sets of locations are tested. After this, a set of optimal fix locations can be selected from the determined sets of fix locations for the sanitizers. The selection can be based on a minimum modification of the code such as the least number of code modifications (or the least number of insertion of sanitizers). The selection can be also based on a minimum effect on functionality of the code. The selection can be also based on a trade-off between the minimum code modification and the minimum effect on code functionality. The selection can be a global optimum or a local optimum. After the selection, a new graph representation of the code can be generated. The new graph representation includes the non-vulnerable first and second data flows with the sanitizers at the selected set of optimal fix locations.

In some implementations, the graph representation of the code is visualized in a user interface (UI). A user (e.g., a developer or a security expert) can view the secure vulnerabilities of the code and decide if one of the findings needs to be fixed or not. The visualized graph representation can be used as a support for auditing of the findings of an automated test tool. In some examples, the user interacts with the graph representation through the UI. A user input can be given to change a vulnerable data flow in the visualized graph representation. The change can include at least one of adding a sanitizer, removing a sanitizer, replacing a sanitizer, or adjusting a location order of at least two sanitizers. The change can also include adding/removing/replacing a source or a sink. Vulnerability information of the changed data flows can be determined based on the information of vulnerable source, sinks, and sanitizers stored in the database.

In some cases, a new graph representation of the code is generated to represent the changed data flows with the corresponding determined vulnerability information and visualized in the UI. In some cases, optimal fix locations (e.g., locations at which sanitizers can be inserted to fix the vulnerability of the changed data flows) are computed, and a new graph representation is generated to represent the non-vulnerable data flows with the sanitizers at the optimal fix locations and visualized in the UI. In some cases, the sanitizers at the optimal fix locations in the data flows can be represented as a recommendation option in the UI to the user, together with the new graph representation representing the changed data flows with the corresponding determined vulnerability information.

In some implementations, an automated test tool uses application security testing, such as Static Application Security Testing (SAST), Interactive Security Testing (IAST), or Dynamic Application Security Testing (DAST), to analyze the code for finding secure vulnerabilities. The security vulnerabilities (e.g., vulnerabilities to SQL injections, and/or Cross-site-Scripting (XSS)) can be caused by unchecked (unvalidated) data flows from a source (e.g., input from a user) to a sink (e.g., access to a database). In some cases, one countermeasure to ensure that safe user input flows to the sink is to sanitize the input. Sanitizing refers to a process of checking the input for any dangerous content and either removing this content, stopping further processing of the content, or changing the input into an acceptable format.

In some examples, vulnerable data flows are in a small function or code block (e.g., less than 10 lines in size). In some examples, in large software subjects, data flows need to be analyzed that go across more than ten (even hundredth) functions or procedures and as well as equal number of modules or classes, which makes fixing vulnerabilities difficult. In some cases, combinations out of sinks and data flows—or multiple sanitation functions along the same data path—might conflict each other. Fixing a vulnerability might also impact the business functionality.

In some implementations, an input sanitation is added as close as possible to the source (e.g., directly after reading the data from the sink) and an output sanitation as close as possible to the sink (e.g., directly preceding the sink). In some cases, adding sanitizers at these points might influence a large number of data flows and, thus, might have a large number of unforeseen effects such as changing the functional behavior of an application (e.g., introducing functional bugs) and inadvertently de-activating sanitation functions (or other protection mechanism) on a sub-set of the data flows from the sink or into the source.

Different secure and vulnerable data flows can exist. In a first example, a data flow is from a source (or input) to a sink (or output). In a second example, two sources influence a same sink, that is, input entered to either (or both) of the sources flows into the sink. In a third example, one source influences two difference sources, that is, input entered into the sink may influence either one of the sinks or both sinks. In a fourth example, data from a dangerous source flows into a vulnerable sink of the same type, which makes the data flow vulnerable. In a fifth example, the sink and source are both considered to be potential dangerous, and the overall data flow is secure as sink and source are of a different kind, which makes the data flow non-vulnerable. In a sixth example, by inserting a suitable sanitizer, vulnerability of a data flow is fixed. In a seventh example, a non-suitable sanitizer that does not sanitize an input sufficiently is chosen, which fails to fix the vulnerability of the data flow. In an eighth example, two different sources (e.g., dangerous with respect to two different vulnerabilities) influence a same sink. A sanitizer that is sufficient for both source types is used to fix the vulnerabilities thus the data flow is secure. In a ninth example, data is sanitized by two different sanitizers. The first sanitizer is irrelevant to a dangerous source type, but the second sanitizer is sufficient for the dangerous sink type, thus the overall data flow is secure. In a tenth example, sanitizers might conflict each other, that is, one sanitizer might reverse the effect of a previously applied sanitizer. If the later sanitizer is positioned closer to the sink than the previously applied sanitizer and at least partially reverses the effect of the previously applied sanitizer, the overall data flow is vulnerable.

Implementations of the present disclosure are directed to addressing a problem of finding an optimal location for fixing a program code (or an application) with minimal effort for implementing the fix as well as for testing the functionality (e.g., using regression test) and minimal risk of harming the functionality (e.g., by deleting unnecessary sanitation functions).

Figure 2:
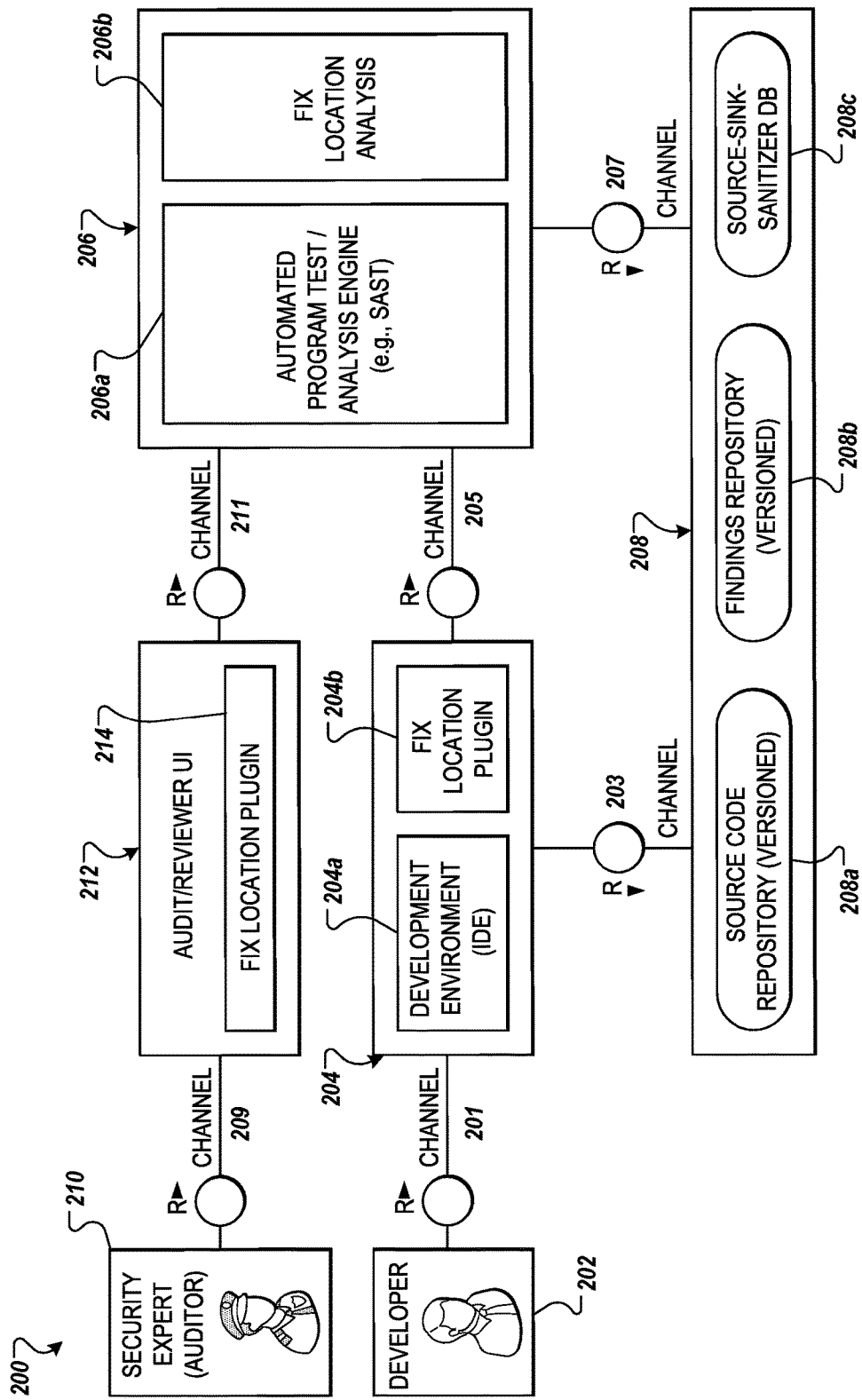
FIG. 2 depicts an example architecture with example components in accordance with implementations of the present disclosure.

As discussed with respect to FIGS. 2 and 3, fixing the program code can be achieved using two algorithms. The first algorithm computes a fix location graph, that is, a graph-based representation of vulnerable (or tainted) data flows. The first algorithm brings the program code into a graph representation. The second algorithms uses the fix location graph as input and computes a set of optimal fix locations (e.g., a fix location as close as possible to the source or sink to cover as many data paths as possible while not introducing unintended changes to the program code).

FIG. 1 depicts an example architecture 100 that can be used to realize implementations of the present disclosure. The example architecture 100 includes client devices 102, 104 communicably connected to a back-end system 106 by a network 108. The client devices 102, 104 are operated by users 110, 112, respectively.

In some examples, the client devices 102, 104 can each be a computing device such as a laptop computer, a desktop computer, a smartphone, a personal digital assistant, a portable media player, a tablet computer, or any other appropriate computing device that can be used to communicate with the back-end system 106. In some examples, the back-end system 106 can include one or more computing devices 106a, such as a server, and one or more database systems 106b. In some examples, the back-end system 106 can represent more than one computing device working together to perform the actions of a server (e.g., cloud computing).

In some implementations, the database system 106b is provided as an in-memory database system. In some examples, an in-memory database is a database management system that uses main memory for data storage. In some examples, main memory includes random access memory (RAM) that communicates with one or more processors (e.g., central processing units (CPUs)) over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage database systems.

In some examples, the network 108 can be a public communication network (e.g., the Internet, cellular data network, dialup modems over a telephone network), a wide area network (WAN), a local area network (LAN), a private communications network (e.g., private LAN, leased lines), or any appropriate combination thereof.

In some examples, user 110 is a developer and can use the client device 102 to communicate with the back-end system 106, for example, to create, debug, and/or modify program code in a development environment (DE) provided by the back-end system 106. The development environment can provide a user interface (UI) presented on a display of the client device 102. User 110 can also start an analysis of the program code for finding potential security vulnerabilities, for example, using an automated test tool. In some implementations, the automated test tool uses application security testing (e.g., SAST or IAST) to analyze the code for finding secure vulnerabilities. The findings can be stored in the database system 106b (e.g., in findings repository). The findings can be presented on the display through the UI. User 110 can view the findings and determine whether a finding needs to be fixed or not.

User 110 can also initialize a fixing of the security vulnerabilities of the program code, for example, using automatic computation of optimal fix locations as discussed above. A graph representation of the program code can be generated based on information of vulnerable sources, sinks, and sanitizers stored in the database system 106b (e.g., in source-sink-sanitizer database). The graph representation represents vulnerable data flows, sources, sinks and visualized in the UI on the display of the client device 102. The visualization of the graph representation can be used for showing the vulnerabilities and/or optimal fix locations to user 110 as well as for user 110 to determine if a finding needs to be fixed or not. User 110 can interact with the graph representation through the UI to change data flows of the code. For example, user 110 can add/remove/replace a source or sink, add/remove/replace a sanitizer, and/or adjust a location order of at least two sanitizers. A new graph representation can be generated based on the user input. The visualized graph representation can be also correlated with the program source code stored in the database system 106b (e.g., in source code repository), which allows jumping from a node of the visualized graph representation to corresponding source code.

In some examples, user 112 is a security expert (or auditor) and can use the client device 104 to communicate with the back-end system 106, for example, to review findings of automated test tools together with underlying coding in an audit (or reviewer) environment provided by the back-end system 106. The audit/reviewer environment can provide a user interface (UI) presented on a display of the client device 104. User 112 can analyze the findings (e.g., in groups) in the audit environment. In some implementations, user 112 initializes enhanced findings analysis, for example, using visualization of a graph representation of the code and computation of optimal fix locations for secure vulnerabilities of the code. User 112 can use the visualization and computation to assess the enhanced findings and decide if a number of findings needs to be fixed or not. User 112 can also use the audit environment to store or update the findings in the database system 106b (e.g., in findings repository).

Implementations of the present disclosure are described in further detail herein with reference to an example context. The example context includes application of fixing security vulnerabilities of computer-readable code. It is contemplated, however, that implementations of the present disclosure are applicable in any appropriate context. For example, it can also be applied to fixing functional bugs, defects in computer-readable code.

FIG. 2 depicts an example architecture 200 with example system components in accordance with implementations of the present disclosure. The architecture 200 provides a development environment (DE) 204 for developers 202 (e.g., user 110 of FIG. 1) and an audit (or reviewer) environment 212 for security experts (or auditors) 210 (e.g., user 112 of FIG. 1).

The development environment 204 provides a user interface (UI) for developers 202. In the development environment 204, developers 202 can create, debug, and modify program code. Developers 202 can also start a static analysis of the program code for finding (potential) security vulnerabilities. The development environment 204 includes an editor 204a (e.g., an integrated development environment (IDE)). The editor 204a can be used by developers 202 to create/modify program code. Among others, the editor 204a can also provide syntax highlighting and allow to issue a static analysis.

The development environment 204 also includes a fix location plugin 204b. The fix location plugin 204b in the actual development environment 204 can provide visualizations of the data flows, defects/vulnerabilities, as well as the recommendation of optimal fix locations.

The audit environment 212 provides an audit/review UI for security experts 210 that allows them to review results of the automated test tools together with the underlying coding. The audit environment 212 also includes a fix location plugin 214. The fix location plugin 214 can be the same as the fix location plugin 204b in the development environment 204 and provide visualizations of the data flows, defects/vulnerabilities, as well as the recommendation of optimal fix locations.

The architecture 200 includes an automated engine 206 that includes an automated program test/analysis engine 206a and a fix location analysis module 206b. The automated program test/analysis engine 206a represents an automated test tool (e.g., for SAST or IAST). Among others, the engine 206a computes control flows and data flows that contain defects or debugs. The engine 206a can be combined with the fix location analysis module 206b, which can use the data flows and control flows from the findings of the engine 206a to compute optimal fix locations for secure vulnerabilities of the findings.

The architecture 200 includes one or more database systems 208, including source code repository 208a, findings repository 208b, and source-sink-sanitizer database (DB) 208c. The database systems 208 can be similar to the database systems 106b of FIG. 1.

The source code repository 208a can be a (versioned) storage (e.g., a file system or a database) that stored the source code. The source code repository 208a allows to read and write code and/or to access different versions (e.g., a history) of the code.

The findings repository 208b can be a (versioned) storage (e.g., a file system or a database) that stores the results (or findings) of the automated test tool 206a (e.g., SAST or IAST) as well as audit results.

The source-sink-sanitizer DB 208c contains information of vulnerable sources, sinks, and sanitizers. For example, the information can include different types of vulnerable sources (e.g., SQL injection and XSS for web applications). The information can include which sanitizer is suitable for sanitizing an input from a specific source and/or an output to a specific sink, as well as the information about conflicting orders of sanitizers.

Developers 202 can access the development environment 204 through channel 201. The development environment 204 can communicate with the database systems 208 through channel 203 and the automated engine 206 through channel 205. The automated engine 206 can communicate with the database system 208 through channel 207. Security expert 210 can access the audit environment 212 through channel 209. The audit environment 212 can communicate with the automated engine 206 through channel 211. In some implementations, the development environment 204, the audit environment 212, the automated engine 206, and the database system 208 are included in a back-end system (e.g., the back-end system 106 of FIG. 1). Channels 203, 205, 207, and 211 can be a system bus. Channels 201 and 211 can include a network connection (e.g., the network 108 of FIG. 1).

In some implementations, the fix location analysis module 206b is configured to perform a first algorithm for computing a graph representation of computer-readable code (called Algorithm 1). The first algorithm can implement a process with respect to FIG. 3A. The input of the first algorithm is a set of D representing the data flows of the analyzed program and a look-up table S that contains the information vulnerable sources, sinks, as well as sanitizers and conflicts between the sanitizers. The output of the first algorithm is a graph representation G.

An example program code of the first algorithm can be as follows:

```
 1: function BuildFixLocationGraph (D: Set (DataFlow), S: Set
    (SinkSourceSanitiser))
 2:     V ← { }
 3:     E ← { }
 4:     for all d ∈D do
 5:         V_d ← { }
 6:         src ← SrcOf(d)
 7:         sink ← SinkOf(d)
 8:         V_d ← V_d ∪{(src, TypesOf(src))}
 9:         V_d ← V_d ∪{(sink, TypesOf(sink))}
10:         for all s ∈ GetSanitiser(d) do
11:             V_d ← V_d ∪{(s, TypesOf(s))}
12:         end for
13:         for all d' ∈D do
14:             if HasCommonPrefix(d, d') then
15:                 V_d ← V_d ∪ {(PrefixSplitStatement(d, d'), { })}
16:             end if
```

```
17:     if HasCommonPostfix(d, d') then
18:         V_d ← V_d ∪ {(PostfixJoinStatement(d, d'), { })}
19:     end if
20:   end for
21:   V_topsort ← TopSort(V_d)
22:   T ← { }
23:   for all v ∈ V_topsort do
24:     if IsSrc(v) then
25:         T ← T ∪ snd(v)
26:     end if
27:     if IsSanitiser(v) then
28:         T ← T \ snd(v)
29:     end if
30:     if IsSink(v') then
31:         if CheckSanitisationConflict(v', V_topSort, S) then
32:             T ← T ∩ ComputeEffectiveSanitation(v', V_topSort, S)
33:             T ← T ∪ ComputeReIntroducedTaints(v', V_topSort, S)
34:         else
35:             T ← T ∩ snd(v)
36:         end if
37:     end if
38:     v' ← SuccOf(v, V_topsort)
39:     E ← E ∪{((v,v'), T)}
40:   end for
41:   V ← V ∪ V_d
42:   end for
43:   G ← (V, E)
44:   return G
45: end function
```

In some implementations, the fix location analysis module 206b is configured to perform a second algorithm for computing optimal fix locations for security vulnerabilities of computer-readable code (Algorithm 2). The second algorithm can use the computed graph representation as input and compute a set of optimal fix locations. The second algorithm can implement a process with respect to FIG. 3B.

The second algorithm can introduce a sanitizer at a location as close as possible to a set of sinks (or sources) and check if there are conflicts. If a conflict is detected, the next possible fix location is tested. If a sanitizer is introduced as close as possible to a sink (e.g., output sanitation), the second algorithm starts backward from sink: for all combinations of incoming data-flows, the second algorithm inserts a sanitizer and checks if this fixes the vulnerability (this includes the check for conflicting sanitizations). This process is continued until a limited search depth is reached or all combinations are tested. After this, a solution with the least number of code modifications (e.g., a least number of insertion of sanitizers) is selected. In some cases, in case of an unbounded search, this selection is a global optimum. In some cases, the selection is a local optimum.

The second algorithm can be applied for finding the optional location of an input sanitation. For this, the search direction is reversed and the search is started with a source. In some implementations, the second algorithm may be used to find conflicts with existing sanitizers in the data flows. The second algorithm can change or remove existing sanitizers to optimize the number of sanitizers in the data flows.

An example code of the second algorithm can be provided as follows:

```
1:  function ComputeOptimalFixLocation(g: FixLocationGraph, Stmts : Set(Statement), isSink : Boolean, depth : Integer)
2:    function insertOrMoveSanitiser(g' : FixLocationGraph, Stmt : Statement, isSink : Boolean)
3:        if FindSanitiserForStmt(g', stmt) then
4:            if isSink then
5:                g"← InsertSanitiserAsPredecessor(g',stmt)
6:            else
7:                g"← InsertSanitiserAsSuccessor(g',stmt)
8:            end if
9:        else
10:           if isSink then
11:               if PredecessorOfSanitiserIsNotSource(g',stmt) then
12:                   g"← MoveSanitiserUp(g',stmt)
13:               else
14:                   return g
15:               end if
16:           else
17:               if SuccessorOfSanitiserIsNotSink(g',stmt) then
18:                   g"← MoveSanitiserDown(g',stmt)
19:               else
20:                   return g'
21:               end if
22:           end if
23:       end if
24:       g"← ResolveConflicts(g',g")
25:       return g"
26:   end function
27:   Q ← ( )
28:   g'← g
29:   g"← ( )
30:   while (depth≠0) ⊥ (Stmts≠∅) do
31:       g"← ( )
32:       for all stmt ∈ Stmts do
33:           g"← insertOrMoveSanitiser(g',stmt,isSink)
34:           if g' = g" then
35:               Stmts ← Stmts \{stmt}
36:           end if
37:       end for
38:       c ← numberOfChanges(g,g')
39:       Q ← insertInPriorityQueue(Q,g',c)
40:       depth ← depth − 1
41:   end while
42:   return firstOfPriorityQueue(g')
43: end function
```

Figure 3A:
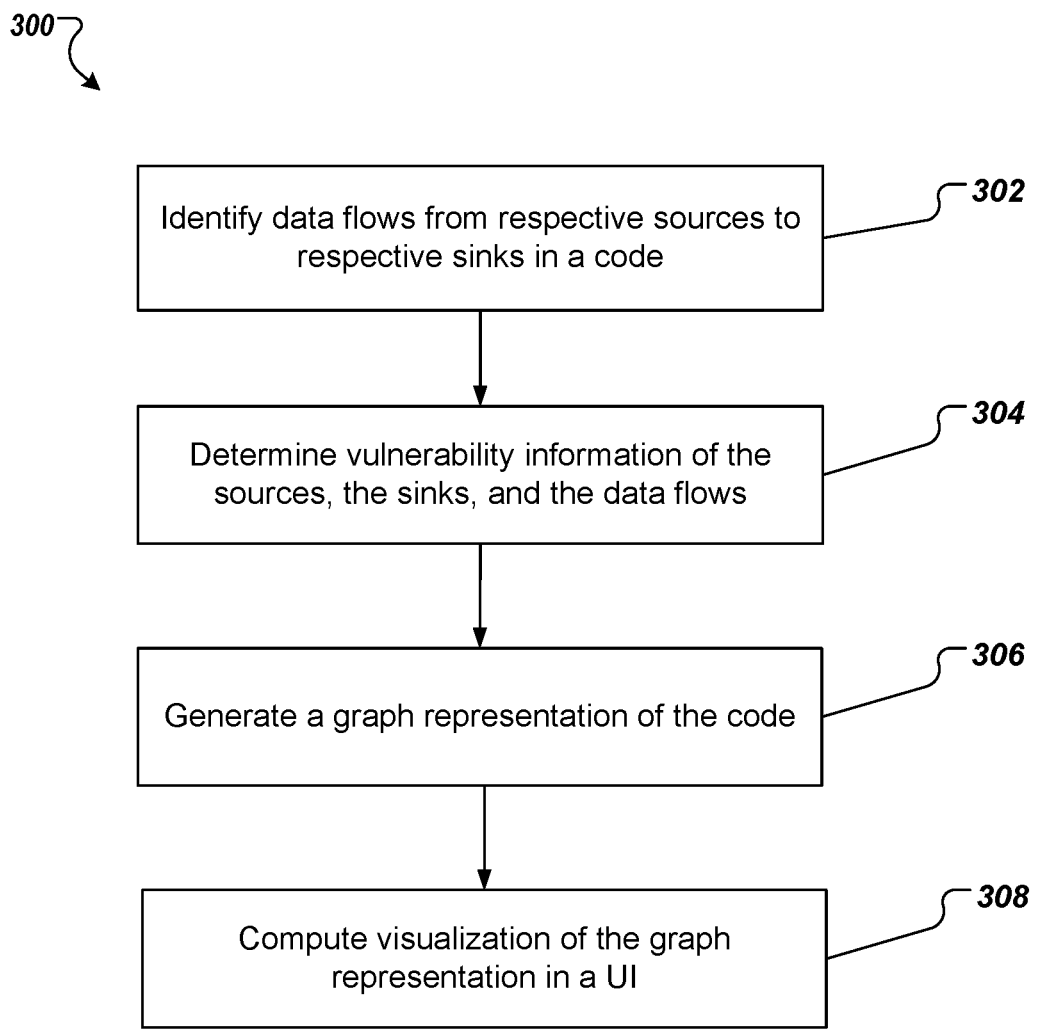
FIG. 3A depicts an example process that can be executed in accordance with implementations of the present disclosure.

FIG. 3A depicts an example process 300 that can be executed in accordance with implementations of the present disclosure. In some examples, the example process 300 can be provided as one or more computer-executable programs executed using one or more computing devices. The process 300 can be performed by a module (e.g., the fix location analysis module 206b of FIG. 2 and/or the fix location plugin 204b of FIG. 2) to generate a graph representation of computer-readable code.

Data flows in the code are identified (302). The module uses information associated with the code to identify the data flows from respective sources to respective sinks. In some examples, the information includes the code itself, and the module can read the information from source code repository (e.g., the source code repository 208a of FIG. 2). In some examples, the information includes findings from an automated testing tool (e.g., the automated program test/analysis engine 206a of FIG. 2), and the module can read the information from findings repository (e.g., the findings repository 208b of FIG. 2). As noted above, data can flow from one or more sources to a single sink or a single source to one or more sinks.

Vulnerability information of the sources, the sinks, and the data flows are determined (304). The module can access information of vulnerable sources and sinks stored in a database (e.g., the source-sink-sanitizer DB 208c of FIG. 2) and determine the vulnerability information of the sources, the sinks, and the data flows. For example, the module can determine whether a source or sink is vulnerable and which vulnerable type of the source or sink is. If the data flows include sanitizers, the module can also access information of sanitizers stored in the database and determine the types of the sanitizers, whether the sanitizers fix secure vulnerability of the data flows, whether the sanitizers conflict with other sanitizers, or whether the sanitizers are unnecessary.

A graph representation of the code is generated (306). The graph representation includes the vulnerable data flows with determined vulnerable information. In some implementations, the graph representation can be a directed graph where both edges and vertices are labelled. Sources and sinks can be represented by different shapes (e.g., sources by squares and sinks by circles). A downward pointing triangle can be used to mark joining of data flows, and an upward pointing triangle can be used to mark forking data flows. Sanitation functions or sanitizers can be represented by rectangles with vertical bars or horizontal bars. Note that a single source, sink, or sanitizer might be associated with different vulnerabilities.

Visualization of the graph representation in a user interface (UI) is computed (308). The graph representation can be visualized in the UI. In some examples, a filling pattern is used to distinguish the different source-types, sink-types, and sanitizer-types. For example, horizontal lines might represent sources, sinks and sanitizers for SQL injections, while vertical lines mark Cross-site-Scripting (XSS). No filling pattern represent secure sources and/or sinks. A secure data flow can be represented by an empty circle surrounding a sink, while a vulnerable data flow can be represented by a circle with filling dots surrounding a sink. An example visualization of the graph representation can be with respect to FIG. 4A.

In some examples, a color coding is used to distinguish the different source-types, sink-types, and sanitizer-types. For example, blue might represent sources, sinks and sanitizers for SQL injections, while yellow marks Cross-site-Scripting (XSS). A secure data flow can be represented by an empty circle surrounding a sink, while a vulnerable data flow can be represented by a circle with filling dots surrounding a sink. White represents secure sources and sinks. A secure data flow can be represented by a circle filled with green surrounding a sink, while a vulnerable data flow can be represented by a circle filled with red surrounding a sink.

In some implementations, the visualization of the graph representation of the code including the vulnerable data flows is presented on a display screen of a computing device associated with a user (e.g., user 110 or 112 of FIG. 1, developers 202 or security experts 210 of FIG. 2). The user can view the vulnerability of the data flows and decide whether a vulnerable data flow should be fixed and/or how the vulnerability can be fixed. An input to change one or more data flows from the user through the UI can be received. The input can include at least one of adding a sanitizer or source or sink, removing a sanitizer or source or sink, or adjusting a location order of at least two sanitizers. Optionally, vulnerability information of the changed data flows can be determined based on information of vulnerable sources, sinks, and sanitizers stored in the database. A new graph representation of the code can be then generated to include the changed data flows with the corresponding determined vulnerability information. Visualization of the new graph representation of the code in the UI can be computed and displayed on the display screen of the computing device. The user can repeat changing the graph representation of the code.

In some implementations, the module accesses the source code stored in the source code repository and correlates the source code with the visualization, which allows jumping from a node of the visualization to the corresponding source code. The user can rely on the correlation to switch from the visualization to the source code.

Figure 3B:
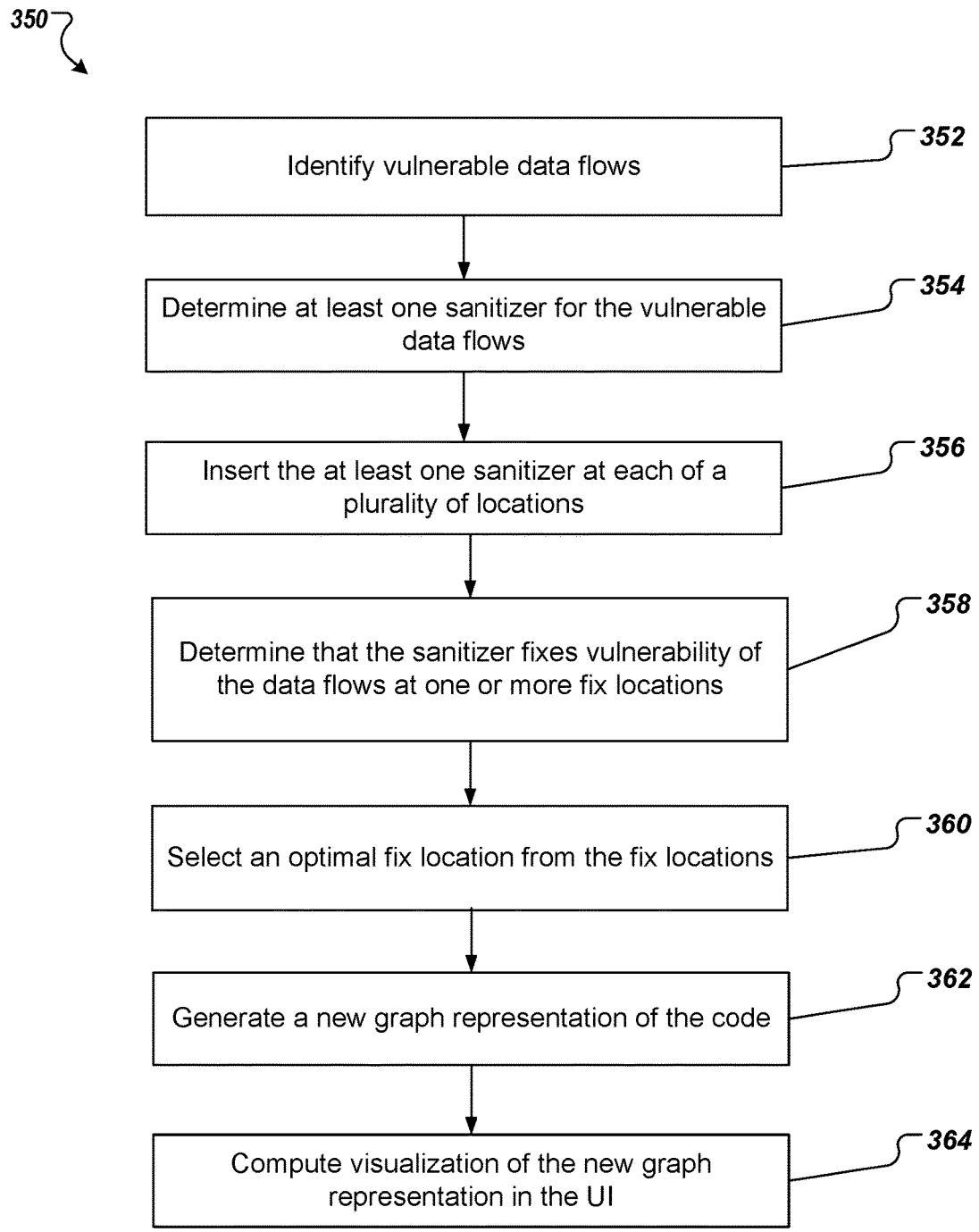
FIG. 3B depicts an example process that can be executed in accordance with implementations of the present disclosure.

FIG. 3B depicts an example process 350 that can be executed in accordance with implementations of the present disclosure. In some examples, the example process 350 can be provided as one or more computer-executable programs executed using one or more computing devices. The process 350 can be performed by a module (e.g., the fix location analysis module 206b of FIG. 2 and/or the fix location plugin 204b of FIG. 2) to compute optimal fix locations for secure vulnerabilities of computer-readable code.

Vulnerable data flows from respective sources to respective sinks are identified (352). A graph representation of the code generated in the process 300 can be used as an input to identify the vulnerable data flows. The vulnerable data flows can include a first vulnerable data flow from at least one first source to a first sink and a second vulnerable data flow from at least one second source to a second sink. In some examples, the at least one first source and the at least one second source have a common source. For example, the at least one first source includes source 0, and the at least one second source includes source 0 and source 1.

At least one sanitizer for the vulnerable data flows is determined (354). The sanitizer can be determined based on information of sanitizers and vulnerability information of the data flows and the respective sources and sinks. The information of sanitizers can be stored in a database (e.g., the source-sink-sanitizer DB 208c of FIG. 2). The database can associate respective sanitizers to respective sources and sinks. The database can also include conflicts between sanitizers. The determined sanitizer can be used to fix the vulnerability of the data flows. For example, the common source for the first and second data flows Source 0 can be a vulnerable source. Source 1 is a secured source. The determined sanitizer can be a suitable sanitizer for fixing the vulnerability of the common source.

The at least one sanitizer is inserted into the data flows at each of a plurality of locations (356) and determined to fix vulnerability of the data flows at one or more fix locations (358). In some implementations, determining that the sanitizer fixes vulnerability of the data flows at a fix location includes determining that there is no conflict between the inserted sanitizer with one or more existing sanitizers in the data flows.

As noted above, the insertion of the sanitizer can start backward from a location adjacent to a sink or forward from a location adjacent to a source. For example, the location can be adjacent to the first sink in the first data flow and the second sink in the second dataflow or be adjacent to the common source. If the inserted sanitizer at a location causes conflicts with existing sanitizers, the next location is tested. In some cases, one or more additional sanitizers are introduced to eliminate the conflict. The determination of fix locations continues until the number of tested locations reaches a threshold or all combinations of the data flows are tested.

In some implementations, the at least one sanitizer includes first and second sanitizers. Each of the plurality of locations includes a respective set of a first location for the first sanitizer and a second location for the second sanitizer. Determining that the at least one sanitizer fixes vulnerability of the first and second data flows includes determining, for each of the fix locations, that the first sanitizer at a first fix location and the second sanitizer at a second fix location fix the vulnerability of the first and second data flows.

An optimal fix location is selected from the determined fix locations (360). The selection can be based on determining that inserting the sanitizer at the optimal fix location causes at least one of a minimum modification of the code or a minimum effect on functionality of the code. The optimal fix location can be a set of first optimal fix location for a first sanitizer and a second optimal fix location for a second sanitizer.

A new graph representation of the code is generated (362). The new graph representation includes the fixed data flows, that is, the non-vulnerable data flows, with the sanitizer at the optimal fix location. Visualization of the new graph representation can be computed in the UI (364). The visualization can be presented in a display screen of the computing device associated with the user. The user can review and interact with the visualization.

Figure 4A:
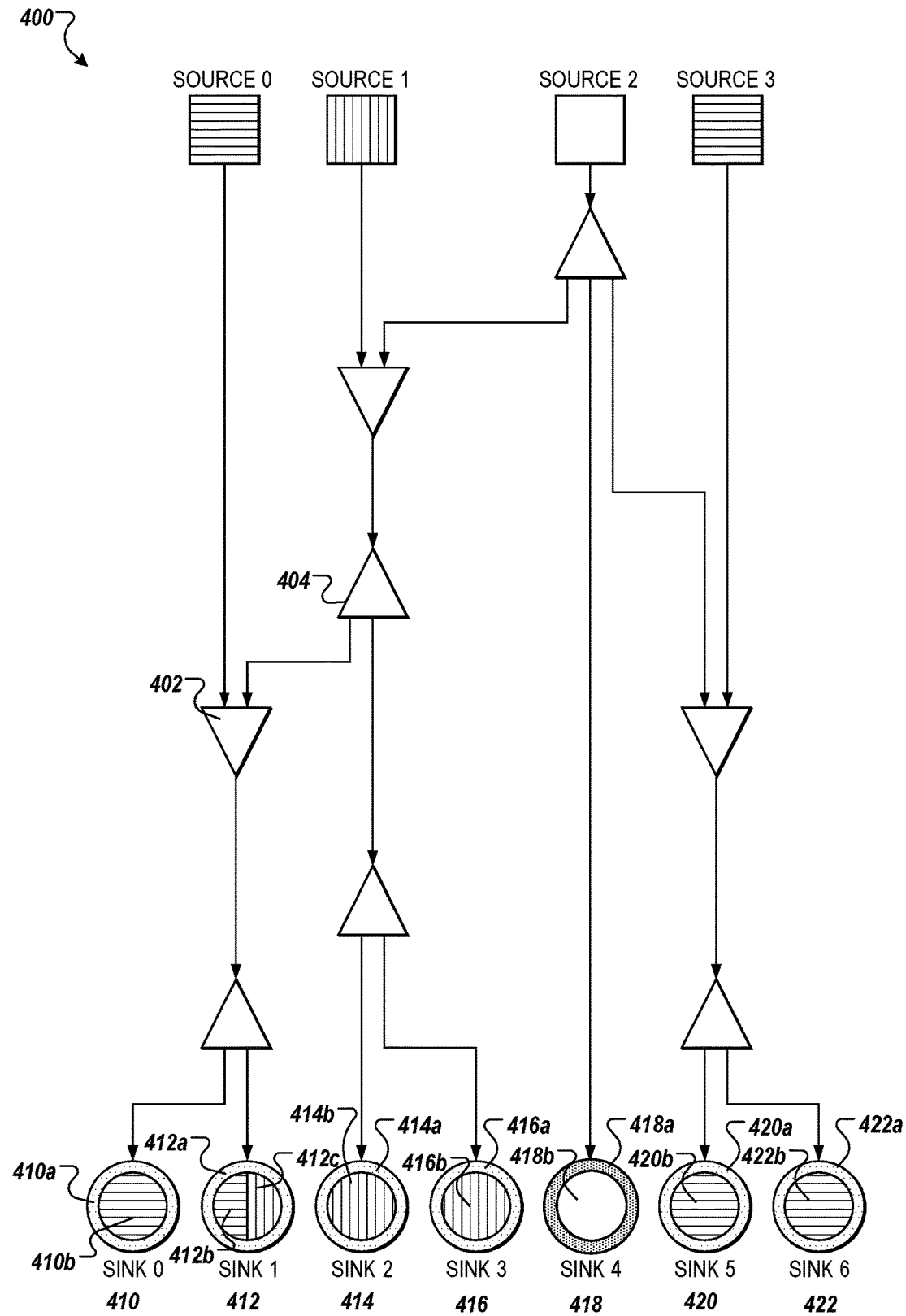
FIGS. 4A-4E depict example location graphs in accordance with implementations of the present disclosure.

FIGS. 4A-4E depict example location graphs in accordance with implementations of the present disclosure. FIG. 4A shows a generated graph representation of computer-readable code, for example, using Algorithm 1 by the fix location analysis module 206b of FIG. 2. FIGS. 4B-4E shows different scenarios where sanitizers at optimal fix locations are introduced to fix vulnerabilities, for example. Using Algorithm 2 by the fix location analysis module 206b of FIG. 2. For illustrations, local optimal fix locations for sanitizers are computed to fix single vulnerabilities in FIGS. 4B-4E. Note that global optimal fix locations for sanitizers can be computed to fix all vulnerabilities.

Referring to FIG. 4A, the graph 400 represents multiple data flows with multiple sources and multiple sinks. For illustrations, the visualization of the graph representation is as follows: sources and sinks are represented by squares and circles, respectively. A downward pointing triangle 402 is used to mark joining of data flows, and an upward pointing triangle 404 issued to mark forking data flows. A filling pattern is used to distinguish the different source-types, sink-types, and sanitizer-types. For example, horizontal lines might represent sources, sinks and sanitizers for a first type of vulnerability (e.g., SQL injections), while vertical lines for a second type of vulnerability (e.g., Cross-site-Scripting (XSS)). No filling pattern represent secure sources and/or sinks. A secure data flow is represented by an empty circle surrounding a sink, while a vulnerable data flow can be represented by a circle with filling dots surrounding a sink.

Sink 0 receives data from source 0, and has the same type of vulnerability as source 0. The data flow 410 from source 0 to sink 0 is unsecured or vulnerable, is represented by an inner circle 410b representing the type of vulnerability in sink 0 and an outer circle 410a marking that the data flow 410 is vulnerable.

Sink 1 receives data from source 0 and source 1, and has a first type of vulnerability 412b same as source 0 and a second type of vulnerability 412c same as source 0. The data flow 412 from source 0 and source 1 to sink 1 is unsecured or vulnerable. An outer circle 412a marks that the data flow 410 is vulnerable.

Sink 2 receives data from source 1 and has the same type of vulnerability as source 1. The data flow 414 from source 1 to sink 2 is unsecured or vulnerable, is represented by an inner circle 414b representing the type of vulnerability in sink 2 and an outer circle 414a marking that the data flow 414 is vulnerable.

Sink 3 receives data from source 1 and source 2. Source 2 is a secure source, thus sink 3 has the same type of vulnerability as source 1. The data flow 416 from source 1 and source 2 to sink 3 is unsecured or vulnerable. An inner circle 416b represents the type of vulnerability of sink 3 and an outer circle 416a marks that the data flow 416 is vulnerable.

Sink 4 receives data from secure source 2 and thus is secure. The data flow 418 from source 2 to sink 4 is secured. An inner circle 418b without filling pattern represents that sink 4 is secured and an outer circle 418a shows that the data flow 418 is secured or non-vulnerable.

Sink 5 receives data from source 2 and source 3. Source 2 is a secure source and source 3 is an unsecure source, thus sink 5 has the same type of vulnerability as source 3. The data flow 420 from source 2 and source 3 to sink 5 is unsecured or vulnerable. An inner circle 420b represents the type of vulnerability of sink 5 and an outer circle 420a marks that the data flow 420 is vulnerable.

Sink 6 receives data from source 3 and has the same type of vulnerability as source 3. The data flow 422 from source 3 to sink 6 is unsecured or vulnerable, is represented by an inner circle 422b representing the type of vulnerability in sink 6 and an outer circle 422a marking that the data flow 422 is vulnerable.

Figure 4B:
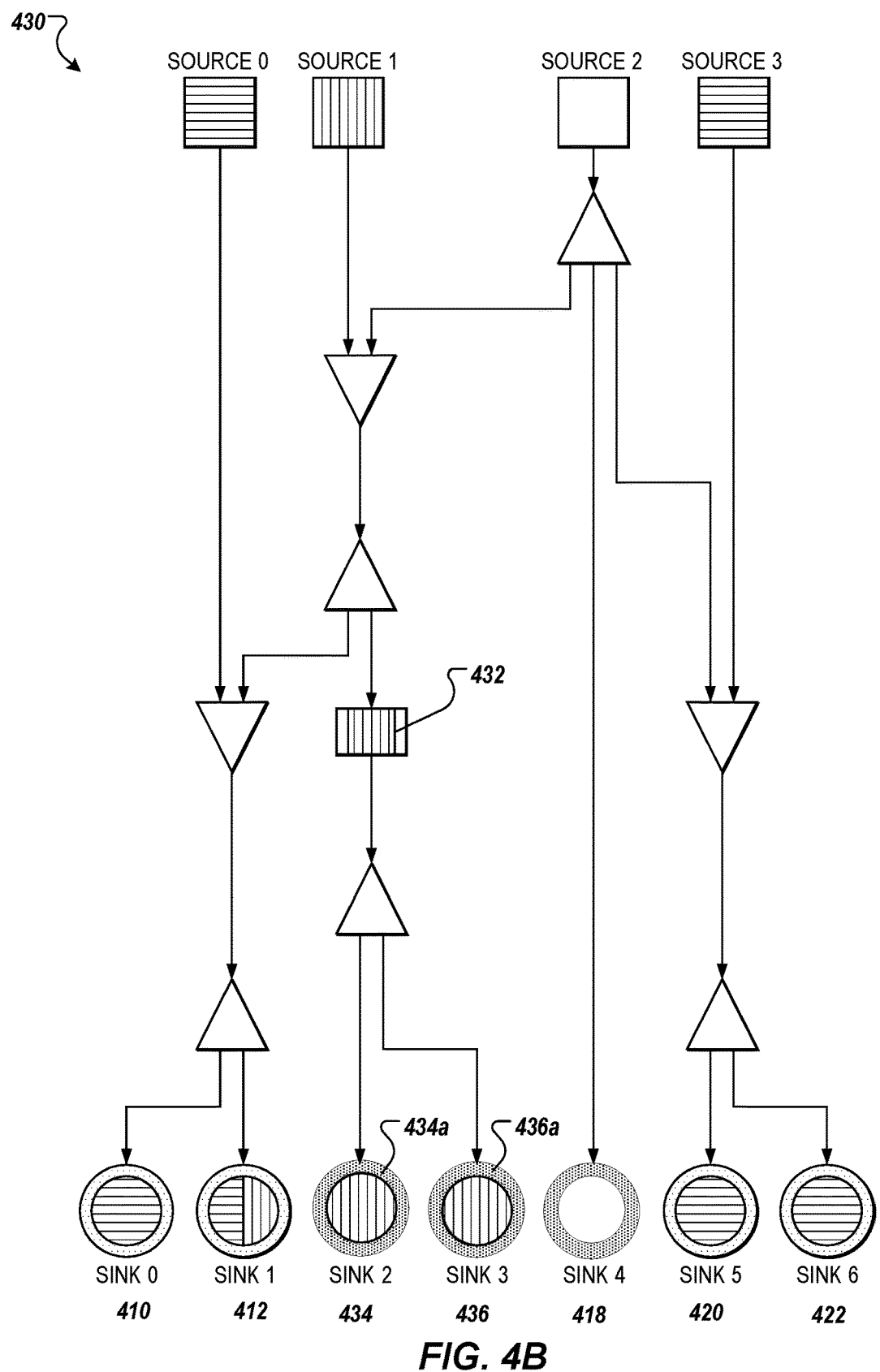

FIG. 4B shows a new graph representation 430 after a sanitizer 432 is introduced to fix the vulnerability of data flows 414 and 416 or sink 2 and sink 3. The sanitizer 432 is marked to have the same filling pattern as the filling pattern of source 1 or sink 2 and sink 3, which is used to indicate that the sanitizer is able to fix the type of vulnerability of source 1. The optimal location for the sanitizer 432 is computed and represented in the graph 430. Since the sanitizer 432 is used to secure both sink 2 and sink 3, the optimal location is adjacent to sink 2 and sink 3 above an upward pointing triangle. The vulnerable data flows 414 and 416 in FIG. 4A becomes the secured or non-vulnerable data flows 434 and 436, respectively. The outer circles 434a and 436b indicate that the data flows 434 and 436 (and sink 2 and sink 3) are secure.

Figure 4C:
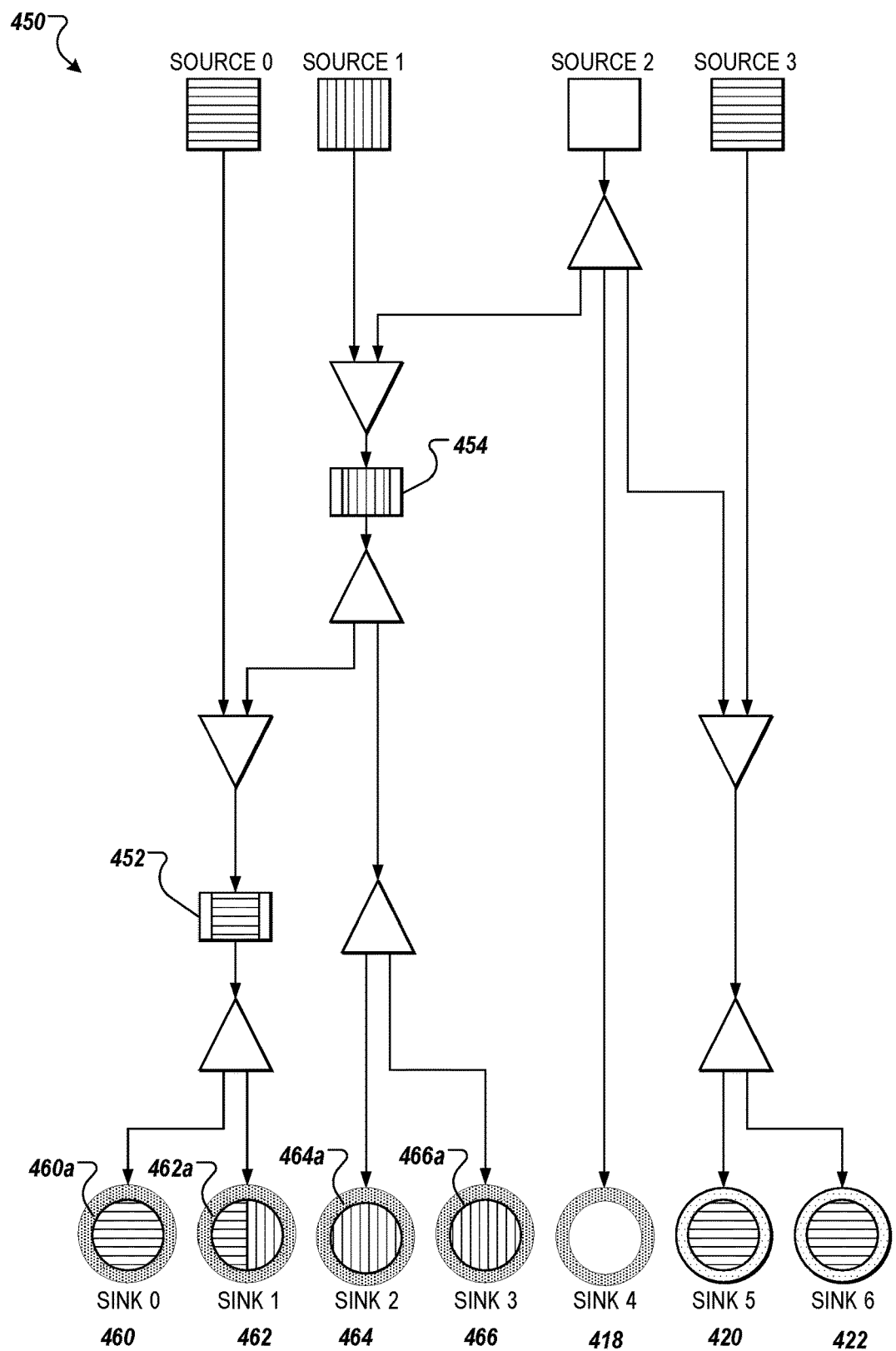

FIG. 4C shows a new graph representation 450 after two sanitizers 452 and 454 are introduced to fix the vulnerability of data flows 410-416 or sinks 0-3. Sanitizer 452 is used to fix the first type of vulnerability of source 0, and sanitizer 454 is used to fix the second type of vulnerability of source 1. Sanitizer 452 and 454 do not conflict. A combination of a first optimal location for sanitizer 452 and a second optimal location for sanitizer 454 is computed and illustrated in FIG. 4C. Sanitizer 452 is in the data flows 410 and 412 to fix the first type of vulnerability in sink 0 and sink 1. Sanitizer 454 is in the data flows 412, 414 and 416 to fix the second type of vulnerability in sink 1, sink 2, and sink 3. The data flows 410-416 become secured data flows 460-466 and outer circles 460a-466a mark the security of the data flows 460-466 and sinks 0-3.

Figure 4D:
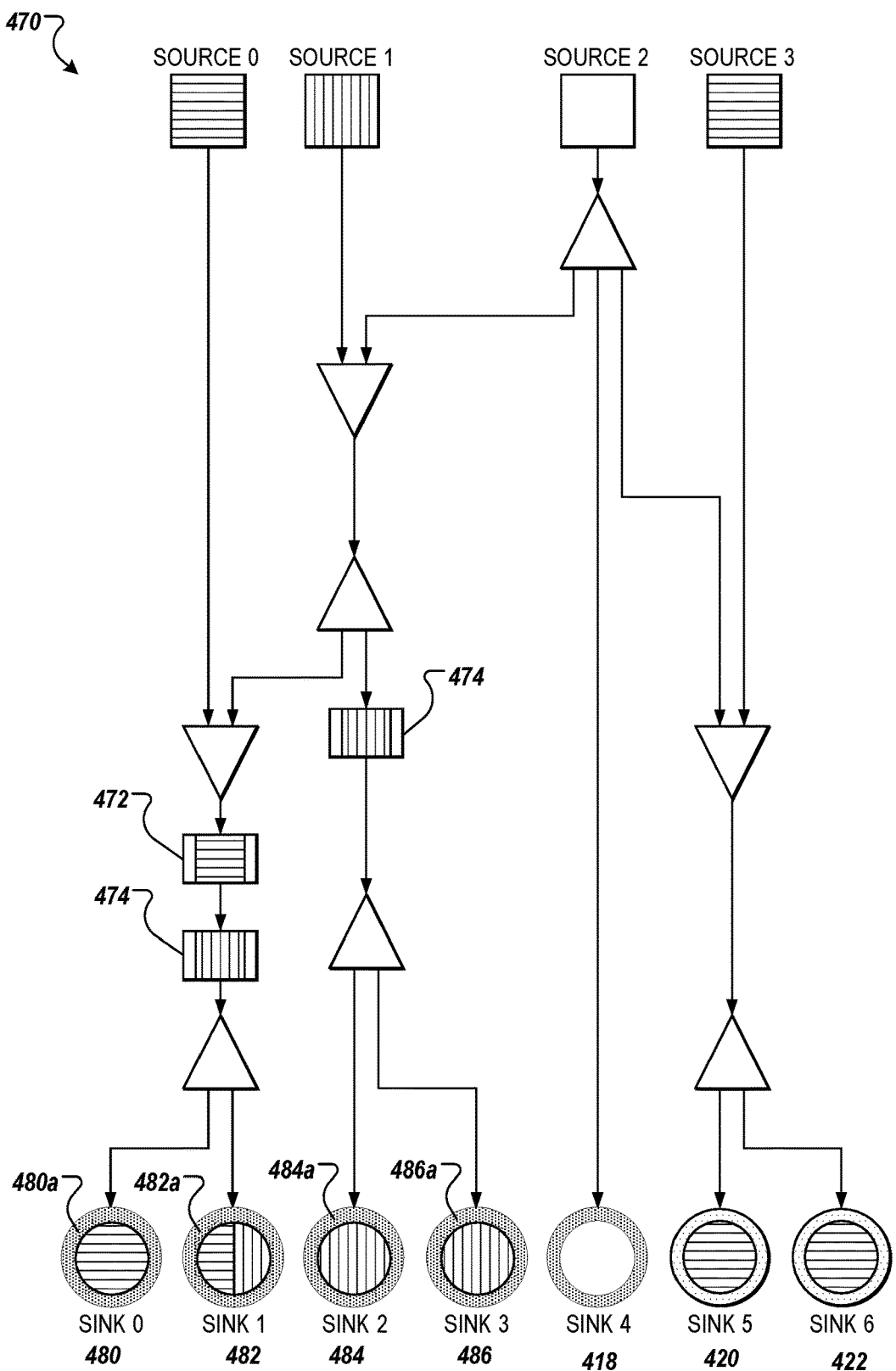

FIG. 4D shows a new graph representation 470 after sanitizers 472 and 474 are introduced to fix the vulnerability of data flows 410-416 or sinks 0-3. Sanitizer 472 is used to fix the first type of vulnerability of source 0, and sanitizer 474 is used to fix the second type of vulnerability of source 1. However, different from sanitizers 452 and 454 in FIG. 4C, sanitizer 472 conflicts with sanitizer 474, such that sanitizer 472 needs to be called prior to sanitizer 474. The combinations of optimal fix locations are illustrated in FIG. 4D. Note that sanitizer 474 needs to be inserted at two locations, as sanitizer 472 cannot pushed further towards source 0, which may result in a non-deterministic order of the sanitizers. The data flows 410-416 become secured data flows 480-486 and outer circles 480a-486a mark the security of the data flows 480-486 and sinks 0-3.

Figure 4E:
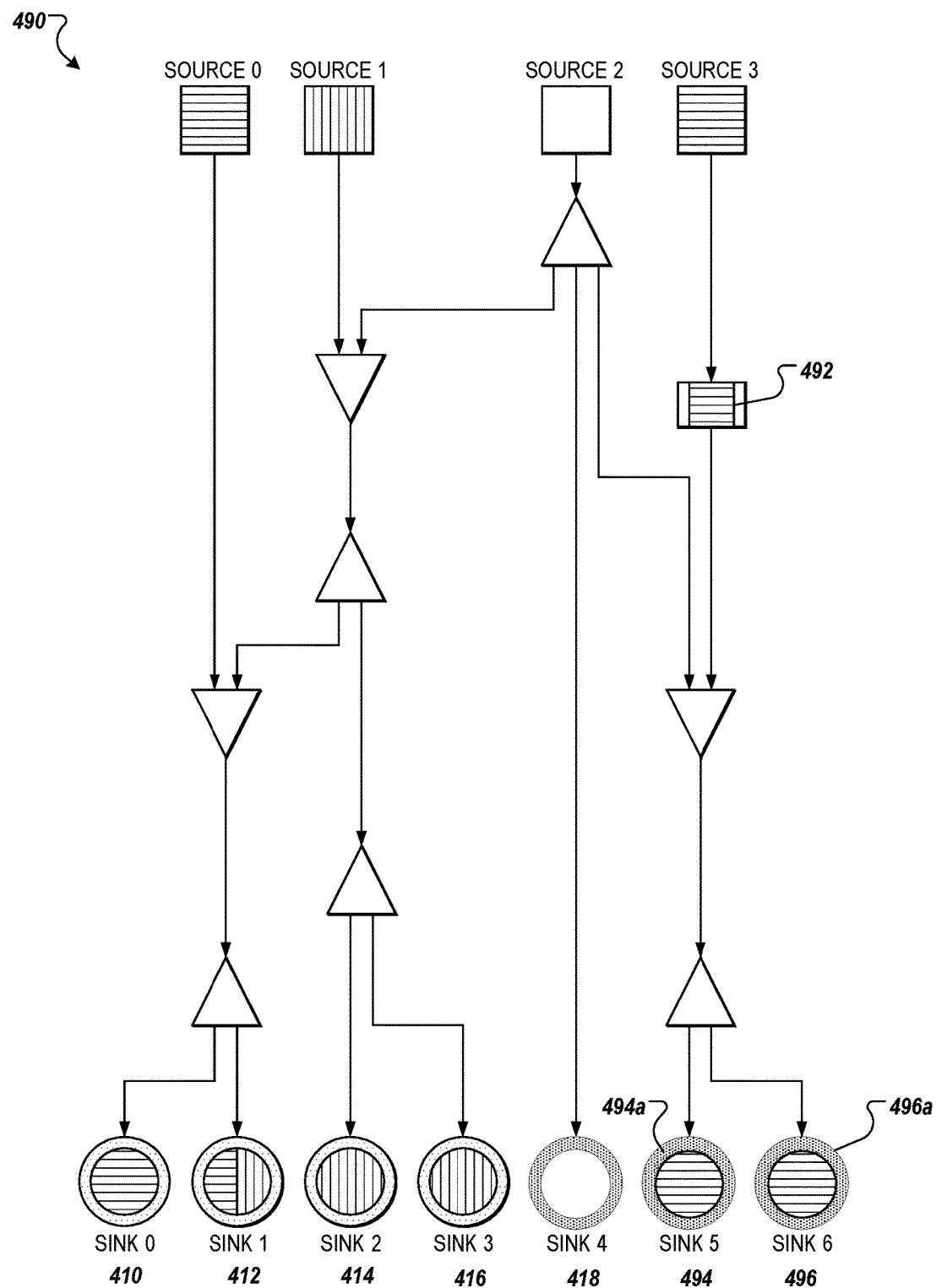

FIG. 4E shows a new graph representation 490 after sanitizer 492 is introduced to fix the vulnerability of data flows 420 and 422 or sinks 5-6. Sanitizer 492 is used to fix the first type of vulnerability of source 3. The optimal fix location for sanitizer 492 is computed and illustrated. Note that sanitizer 492 needs to be pushed up to source 3, as otherwise an unintended modification of a data flow from (secure) source 2 might occur, which could harm the functionality of the code. The data flows 420 and 422 become secured data flows 494 and 496 and outer circles 494a and 496a mark the security of the data flows 494-496 and sinks 5-6.

Figure 5A:
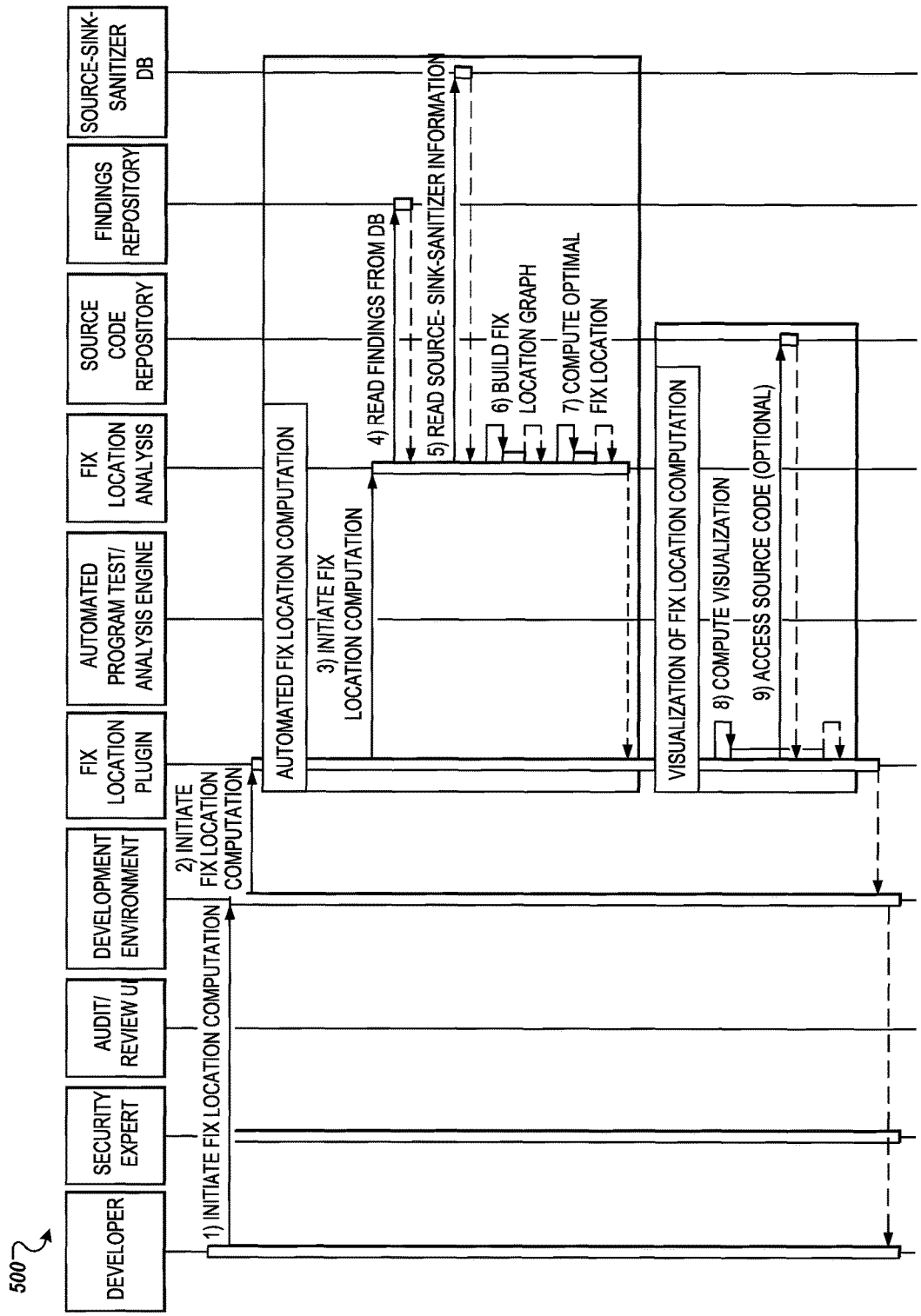
FIGS. 5A-5C depict example processes in accordance with implementations of the present disclosure.
Figure 5B:
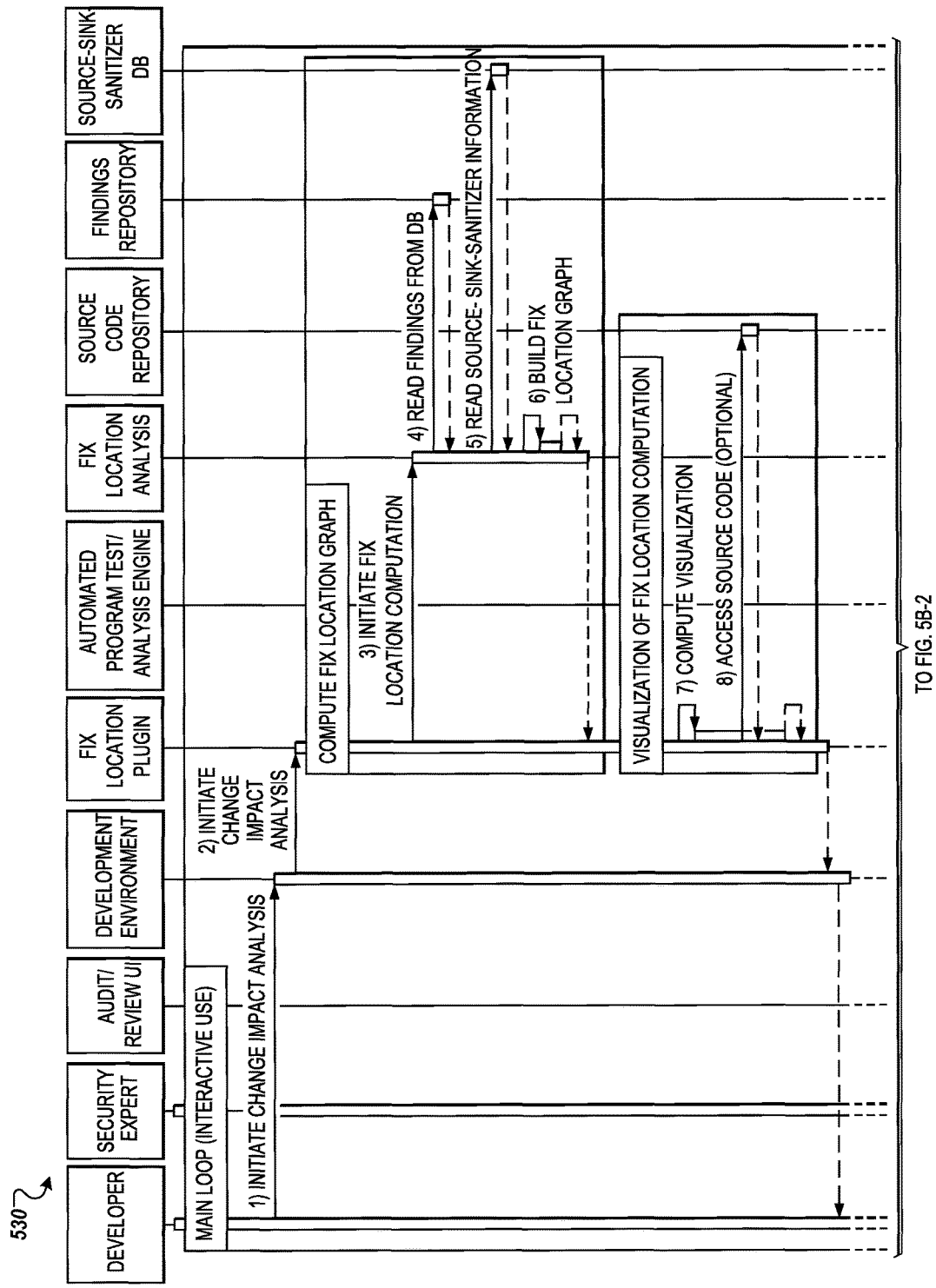
Figures 2, 5B:
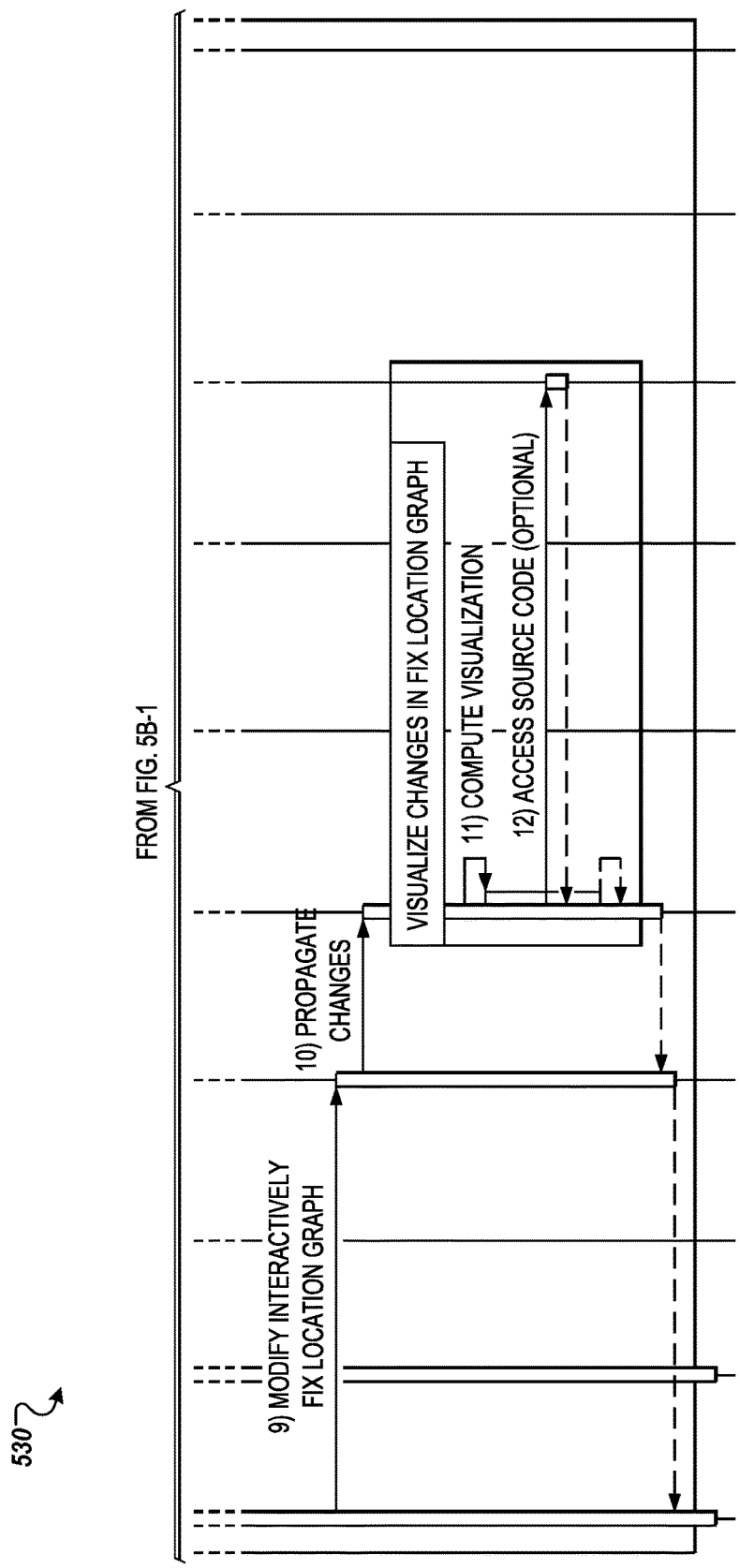
Figure 5C:
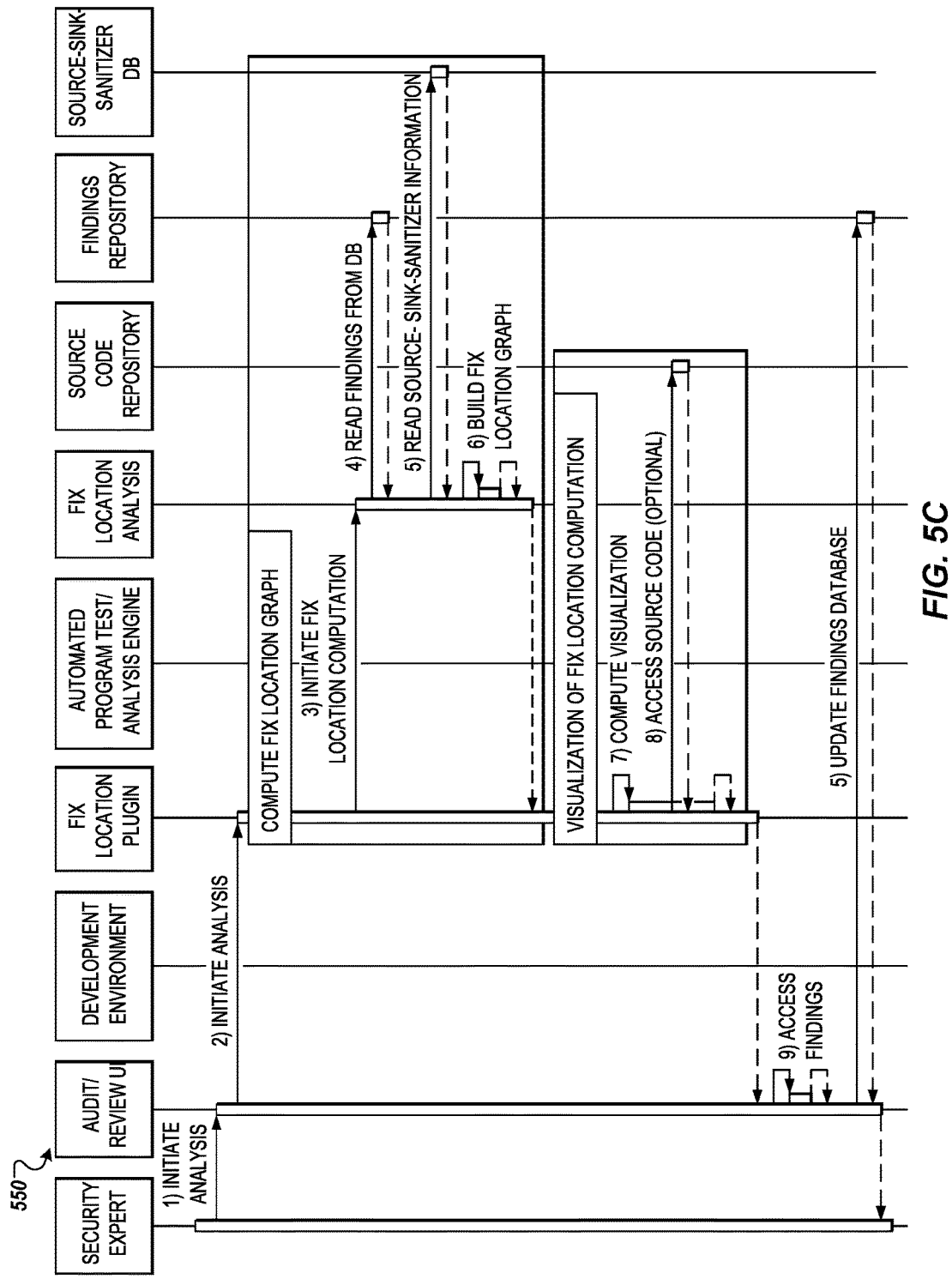

FIGS. 5A-5C depict example processes in accordance with implementations of the present disclosure. The processes can be implemented by the architecture 200 of FIG. 2, for example, after auditing findings of an application security test (e.g., SAST or IAST). FIGS. 5A-5C show three different application scenarios.

FIG. 5A illustrates a process 500 of (automatically) computing optimal fix locations, that is, finding a set of locations that provides a balance between a minimum amount of code that needs to be changed while minimizing the risk of changing the actual functionality.

The process 500 can be as follows: 1) initiating fix location computation: the developer 202 initiates, in his/her development environment 204, the computation of the optimal fix location; 2) initiating fix location computation: the request is delegated from the IDE 204a to the fix location plugin 204b; 3) initiating fix location computation: the fix location plugin 204b delegates the request for computing the optimal fix location to the fix location analysis module 206b; 4) reading findings from DB: the fix location analysis module 206b queries the findings DB 208b to collect all findings that are related (e.g., having the same source or sink) as the finding for which the optimal fix location should be computed; 5) reading source-sink-sanitizer information: as part of the computation of the optimal fix location, the fix location analysis module 206b queries the source-sink-sanitizer DB 208c (e.g., for accessing information about the conflicting sanitizers; 6) building fix location graph: the fix location analysis module 206b computes the fix location graph (e.g., using Algorithm 1 as described in FIGS. 2 and 3A); 7) computing optimal fix location: the fix location analysis module 206b computes the optimal fix location (e.g., using Algorithm 2 as described in FIGS. 2 and 3B); 8) computing visualization: the fix location plugin 204b computes a visualization of the correlated data paths and the optimal fix locations; 9) accessing source code: optionally, the fix location plugin 204b accesses the source code of the application to correlate the source code with the visualization (e.g., to allow jumping from a node of the visualization to the corresponding source code).

FIGS. 5B-1 and 5B-2 illustrates a process 530 of illustrating interactive analysis of changes to a program, that is, which data flows are changed if a sanitizer is inserted into the program. Potential conflicts with existing sanitizers (which, e.g., need to be removed or replaced) are visualized as well.

The process 530 can be as follows: 1) initiating change impact analysis: the developer 202 initiates, in his/her development environment 204, the change impact analysis; 2) initiating change impact analysis: the request is delegated from the IDE 204a to the fix location plugin 204b; 3) initiating fix location computation: the fix location plugin 204b delegates the request for change impact analysis to the fix location analysis module 206b; 4) reading findings from DB: the fix location analysis module 206b queries the findings DB 208b to collect all findings that are related (e.g., having the same source or sink) as the finding for which the optimal fix location should be computed; 5) reading source-sink-sanitizer Information: as part of the computation of the optimal fix location, the fix location analysis module 206b queries the source-sink-sanitizer DB 208c, e.g., for accessing information about the conflicting sanitizers; 6) building fix location graph: the fix location analysis module 206b computes the fix location graph (e.g., using Algorithm 1 as described above); 7) computing visualization: the fix location plugin 204a computes a visualization of the correlated data paths and the optimal fix locations; 8) accessing source code: optionally, the fix location plugin 204b accesses the source code (in the source code repository 208a) of the application to correlate the source code with the visualization (e.g., to allow jumping from a node of the visualization to the corresponding source code); 9) modifying interactively fix location graph: using the user interface, the developer 202 can interactively change the fix location graph. Possible changes include removing of sanitation methods, introducing sanitation functions, changing/replacing sanitation functions, removing or changing sources or sinks; 10) propagating changes: the changes are propagated from the IDE 204a to the fix location plugin 204b; 11) computing visualization: the fix location plugin 204b computes a visualization of the differences, that is, the impact of the changes; 12) accessing source code: optionally, the fix location plugin 204b accesses the source code of the application to correlate the source with the visualization (e.g., to allow jumping from a node of the visualization to the corresponding source code). Note that this process 530 can be executed in a loop to allow an interactive use.

FIG. 5C illustrates a process 550 of analyzing findings of test tools by the security expert (or auditor) 210. The analyzing of findings is an enhanced findings analysis performed in groups instead of analyzing each and every finding in isolation.

The process 550 can be as follows: 1) initiating analysis: the security expert 210 initiates, in his/her audit environment 212, the enhanced findings analysis; 2) initiating analysis: the request is delegated from the audit environment 212 to the fix location plugin 214; 3) initiating fix location computation: the fix location plugin 214 delegates the request for change impact analysis to the fix location analysis module 206b; 4) reading findings from DB: the fix location analysis module 206b queries the findings DB to collect all findings that are related (e.g., having the same source or sink) as the finding for which the optimal fix location should be computed; 5) reading source-sink-sanitizer information: as part of the computation of the optimal fix location, the fix location analysis module 206b queries the source-sink-sanitizer DB 208c, e.g., for accessing information about the conflicting sanitizers; 6) building fix location graph: the fix location analysis module 206b computes the fix location graph (e.g., using Algorithm 1 as described above); 7) compute visualization: the fix location plugin 214 computes a visualization of the correlated data paths and the optimal fix locations; 8) accessing source code: the fix location plugin 214 accesses the source code of the application to correlate the source code with the visualization (e.g., to allow jumping from a node of the visualization to the corresponding source code); 9) assessing findings: using the computed visualization, the security expert 210 assesses the findings and decides if a set of findings needs to be fixed or not; 10) updating findings DB: using the audit environment 212, the security expert 210 stores his/her findings in the findings repository 208b.

Figure 6:
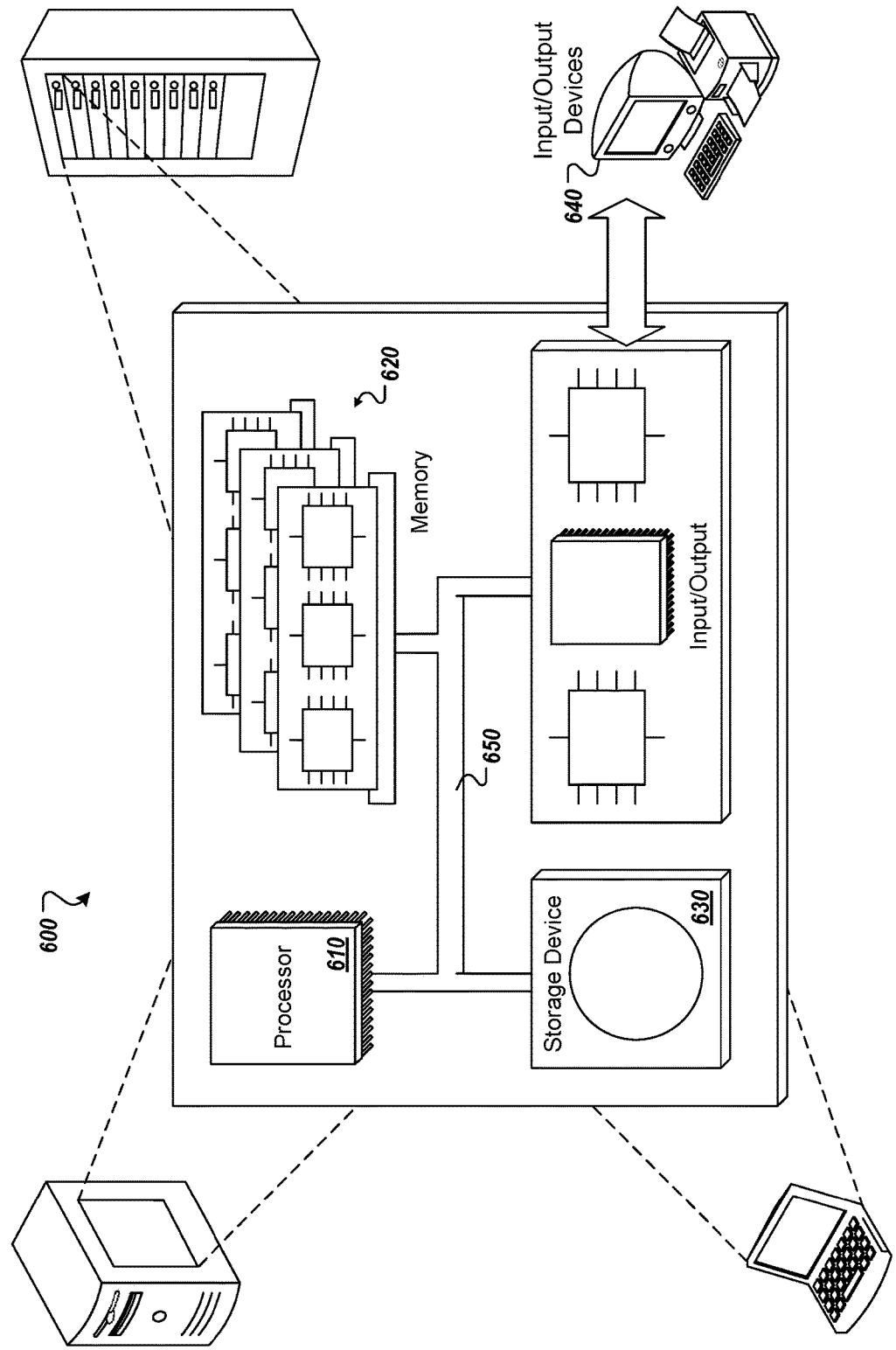
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 400 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   identifying, by the one or more processors, data flows from respective sources to respective sinks in computer-executable code based on information associated with the computer-executable code;
   determining, by the one or more processors, vulnerability information of the respective sources, the respective sinks, and the data flows based on information of vulnerable sources and vulnerable sinks stored in a database, the vulnerability information comprising a vulnerability type of the vulnerable sources and the vulnerable sinks;
   providing, by the one or more processors, a graph representation of the computer-executable code for display, the graph representation depicting the data flows from the respective sources to the respective sinks with the vulnerability information;
   determining, by the one or more processors, based on the vulnerability information whether vulnerabilities associated with two or more of the data flows, the respective sources and the respective sinks are fixable;

in response to determining that the vulnerabilities are fixable, selecting, by the one or more processors and based on the graph representation of the computer-executable code, an optimal fix location for a sanitizer to eliminate the vulnerabilities associated with the two or more of the data flows, the respective sources, and the respective sinks, wherein the optimal fix location is selected based on:
  a determination that the sanitizer fixes the vulnerabilities at a plurality of locations associated with the two or more of the data flows, the respective sources and the respective sinks, and
  a selection, from the plurality of locations, a location for the sanitizer that causes a minimum modification of the computer-executable code;
generating, by the one or more processors, a new graph representation of the computer-executable code comprising non-vulnerable data flows with the sanitizer at the optimal fix location;
processing, by the one or more processors, the new graph representation of the computer-executable code to test a functionality of the computer-executable code and access information about conflicting sanitizers;
modifying, by the one or more processors, the optimal fix location for the sanitizer to minimize a change of the functionality of the computer-executable code and to eliminate conflicts with one or more existing sanitizers of the two or more data flows; and
eliminating the vulnerabilities associated with the two or more of the data flows, the respective sources and the respective sinks by inserting the sanitizer at the modified optimal fix location.

2. The method of claim 1, further comprising:
identifying, in the graph representation, the two or more of the data flows having a common source; and
determining that the sanitizer fixes the vulnerabilities associated with the two or more of the data flows at the modified optimal fix location.

3. The method of claim 2,
wherein determining that the sanitizer fixes the vulnerabilities associated with the two or more of the data flows having the common source comprises:
determining, for the modified optimal fix location, that the sanitizer at the modified optimal fix location fixes the vulnerabilities of the two or more of the data flows having the common source.

4. The method of claim 2,
wherein determining that the sanitizer fixes the vulnerabilities associated with the two or more of the data flows having the common source comprises:
determining that the sanitizer at the modified optimal fix location causes no conflicting sanitization with one or more existing sanitizers in the two or more of the data flows.

5. The method of claim 2, wherein processing the new graph representation of the computer-executable code comprises:
performing a regression test of the new graph representation of the computer-executable code and deleting unnecessary sanitizers.

6. The method of claim 2, wherein inserting the sanitizer at the modified optimal location comprises:
starting the inserting from one of:
  a location adjacent to a first sink in a first vulnerable data flow of the two or more of the data flows having the common source, and
  a location adjacent to the common source.

7. The method of claim 1, further comprising:
computing visualization of the graph representation of the computer-executable code in a user interface (UI);
receiving an input to change the two or more of the data flows in the visualized graph representation through the UI, the changing comprising adding the sanitizer or adjusting a location of the sanitizer;
determining vulnerability information of the changed data flows based on the information of the vulnerable sources and the vulnerable sinks and information of sanitizers stored in the database, the database associating respective sanitizers with the vulnerable sources and the vulnerable sinks;
generating a modified graph representation of the computer-executable code comprising the changed data flows with the determined vulnerability information; and
computing visualization of the modified graph representation of the computer-executable code in the UI.

8. A non-transitory computer-readable storage medium coupled to one or more processors and having instructions stored thereon which, when executed by the one or more processors, cause the one or more processors to perform operations comprising:
identifying, by the one or more processors, data flows from respective sources to respective sinks in computer-executable code based on information associated with the computer-executable code;
determining, by the one or more processors, vulnerability information of the respective sources, the respective sinks, and the data flows based on information of vulnerable sources and vulnerable sinks stored in a database, the vulnerability information comprising a vulnerability type of the vulnerable sources and the vulnerable sinks;
providing, by the one or more processors, a graph representation of the computer-executable code for display, the graph representation depicting the data flows from the respective sources to the respective sinks with the vulnerability information;
determining, by the one or more processors, based on the vulnerability information whether vulnerabilities associated with two or more of the data flows, the respective sources and the respective sinks are fixable;
in response to determining that the vulnerabilities are fixable, selecting, by the one or more processors and based on the graph representation of the computer-executable code, an optimal fix location for a sanitizer to eliminate the vulnerabilities associated with the two or more of the data flows, the respective sources, and the respective sinks, wherein the optimal fix location is selected based on:
  a determination that the sanitizer fixes the vulnerabilities at a plurality of locations associated with the two or more of the data flows, the respective sources and the respective sinks, and
  a selection, from the plurality of locations, a location for the sanitizer that causes a minimum modification of the computer-executable code;
generating, by the one or more processors, a new graph representation of the computer-executable code comprising non-vulnerable data flows with the sanitizer at the optimal fix location;
processing, by the one or more processors, the new graph representation of the computer-executable code to test a functionality of the computer-executable code and access information about conflicting sanitizers;

modifying, by the one or more processors, the optimal fix location for the sanitizer to minimize a change of the functionality of the computer-executable code and to eliminate conflicts with one or more existing sanitizers of the two or more data flows; and eliminating the vulnerabilities associated with the two or more of the data flows, the respective sources and the respective sinks by inserting the sanitizer at the modified optimal fix location.

9. The computer-readable storage medium of claim 8, wherein the operations further comprise:

identifying, in the graph representation, the two or more of the data flows having a common source; and determining that the sanitizer fixes the vulnerabilities associated with the two or more of the data flows having the common source at the modified optimal fix location.

10. The computer-readable storage medium of claim 9, wherein determining that the sanitizer fixes the vulnerabilities associated with the two or more of the data flows having the common source comprises:

determining, for the modified optimal fix location, that the sanitizer at the modified optimal fix location fixes the vulnerabilities of the two or more of the data flows.

11. The computer-readable storage medium of claim 9, wherein determining that the sanitizer fixes the vulnerabilities associated with the two or more of the data flows having the common source comprises:

determining that the sanitizer at the modified optimal fix location causes no conflicting sanitization with one or more existing sanitizers in the two or more of the data flows.

12. The computer-readable storage medium of claim 9, wherein processing the new graph representation of the computer-executable code comprises:

performing a regression test of the new graph representation of the computer-executable code and deleting unnecessary sanitizers.

13. The computer-readable storage medium of claim 9, wherein inserting the sanitizer at the modified optimal fix location comprises:

starting the inserting from one of:
 a location adjacent to a first sink in a first vulnerable data flow of the two or more of the data flows having the common source, and
 a location adjacent to the common source.

14. The computer-readable storage medium of claim 8, wherein the operations further comprise:

computing visualization of the graph representation of the computer-executable code in a user interface (UI);

receiving an input to change the two or more of the data flows in the visualized graph representation through the UI, the changing comprising adding the sanitizer or adjusting a location of the sanitizer;

determining vulnerability information of the changed data flows based on the information of the vulnerable sources and the vulnerable sinks and information of sanitizers stored in the database, the database associating respective sanitizers with the vulnerable sources and the vulnerable sinks;

generating a modified graph representation of the computer-executable code comprising the changed data flows with the determined vulnerability information; and computing visualization of the modified graph representation of the computer-executable code in the UI.

15. A system, comprising:
a client-side computing device; and
a non-transitory computer-readable storage device coupled to the client-side computing device and having instructions stored thereon which, when executed by the client-side computing device, cause the client-side computing device to perform operations comprising:

identifying, by the one or more processors, data flows from respective sources to respective sinks in computer-executable code based on information associated with the computer-executable code;

determining, by the one or more processors, vulnerability information of the respective sources, the respective sinks, and the data flows based on information of vulnerable sources and vulnerable sinks stored in a database, the vulnerability information comprising a vulnerability type of the vulnerable sources and the vulnerable sinks;

providing, by the one or more processors, a graph representation of the computer-executable code for display, the graph representation depicting the data flows from the respective sources to the respective sinks with the vulnerability information;

determining, by the one or more processors, based on the vulnerability information whether vulnerabilities associated with two or more of the data flows, the respective sources and the respective sinks are fixable;

in response to determining that the vulnerabilities are fixable, selecting, by the one or more processors and based on the graph representation of the computer-executable code, an optimal fix location for a sanitizer to eliminate the vulnerabilities associated with the two or more of the data flows, the respective sources, and the respective sinks, wherein the optimal fix location is selected based on:
 a determination that the sanitizer fixes the vulnerabilities at a plurality of locations associated with the two or more of the data flows, the respective sources and the respective sinks, and
 a selection, from the plurality of locations, a location for the sanitizer that causes a minimum modification of the computer-executable code;

generating, by the one or more processors, a new graph representation of the computer-executable code comprising non-vulnerable data flows with the sanitizer at the optimal fix location;

processing, by the one or more processors, the new graph representation of the computer-executable code to test a functionality of the computer-executable code and access information about conflicting sanitizers;

modifying, by the one or more processors, the optimal fix location for the sanitizer to minimize a change of the functionality of the computer-executable code and to eliminate conflicts with one or more existing sanitizers of the two or more data flows; and eliminating the vulnerabilities associated with the two or more of the data flows, the respective sources and the respective sinks by inserting the sanitizer at the modified optimal fix location.

16. The system of claim 15, wherein the operations further comprise:

identifying, in the graph representation, the two or more of the data flows having a common source; and determining that the sanitizer fixes the vulnerabilities associated with the two or more of the data flows having the common source at the modified optimal fix location.

17. The system of claim 16,
wherein determining that the sanitizer fixes the vulnerabilities associated with the two or more of the data flows having the common source comprises:
determining, for the modified optimal fix location, that the sanitizer at the modified optimal fix location fixes the vulnerabilities of the two or more of the data flows.

18. The system of claim 16,
wherein determining that the sanitizer fixes the vulnerabilities associated with the two or more of the data flows having the common source comprises:
determining that the sanitizer at the modified optimal fix location causes no conflicting sanitization with one or more existing sanitizers in the two or more of the data flows, and wherein processing the new graph representation of the computer-executable code comprises:
performing a regression test of the new graph representation of the computer-executable code and deleting unnecessary sanitizers.

19. The system of claim 16, wherein inserting the sanitizer at the modified optimal fix location comprises:
starting the inserting from one of:
a location adjacent to a first sink in a first vulnerable data flow of the two or more of the data flows having the common source, and
a location adjacent to the common source.

20. The system of claim 15, wherein the operations further comprise:
computing visualization of the graph representation of the computer-executable code in a user interface (UI);
receiving an input to change the two or more of the data flows in the visualized graph representation through the UI, the changing comprising adding the sanitizer or adjusting a location of the sanitizer;
determining vulnerability information of the changed data flows based on the information of the vulnerable sources and the vulnerable sinks and information of sanitizers stored in the database, the database associating respective sanitizers with the vulnerable sources and the vulnerable sinks;
generating a modified graph representation of the computer-executable code comprising the changed data flows with the determined vulnerability information; and
computing visualization of the modified graph representation of the computer-executable code in the UI.

* * * * *